US011041995B2

(12) United States Patent
Crawford et al.

(10) Patent No.: US 11,041,995 B2
(45) Date of Patent: Jun. 22, 2021

(54) FIBER OPTICAL CONNECTOR WITH CABLE RETENTION FEATURE

(71) Applicant: PPC BROADBAND, INC., East Syracuse, NY (US)

(72) Inventors: William Crawford, Syracuse, NY (US); Peter Carapella, Fayetteville, NY (US); Noah Montena, Syracuse, NY (US); Tom Carpenter, East Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 16/406,007

(22) Filed: May 7, 2019

(65) Prior Publication Data

US 2019/0339457 A1 Nov. 7, 2019

Related U.S. Application Data

(60) Provisional application No. 62/667,841, filed on May 7, 2018.

(51) Int. Cl.
*G02B 6/36* (2006.01)
*G02B 6/38* (2006.01)

(52) U.S. Cl.
CPC ........... *G02B 6/387* (2013.01); *G02B 6/3887* (2013.01)

(58) Field of Classification Search
CPC .. G02B 6/3887; G02B 6/3893; G02B 6/3869; G02B 6/36; G02B 6/387; G02B 6/3873
See application file for complete search history.

(56) References Cited

U.S. PATENT DOCUMENTS

| 5,261,019 A | 11/1993 | Beard et al. | |
|---|---|---|---|
| 7,090,406 B2 * | 8/2006 | Melton | G02B 6/3869 385/147 |
| 7,481,585 B2 * | 1/2009 | Scadden | G02B 6/3817 385/75 |
| 2004/0223720 A1 | 11/2004 | Melton et al. | |

(Continued)

OTHER PUBLICATIONS

International Search Report and Written Opinion dated Jul. 23, 2019 in corresponding International Application No. PCT/US2019/031223, 6 pages.

(Continued)

*Primary Examiner* — Jennifer Doan
(74) *Attorney, Agent, or Firm* — MH2 Technology Law Group LLP

(57) ABSTRACT

A fiber optic connector includes a ferrule holder configured to receive a ferrule that terminates an optical fiber cable, a connector sub-assembly configured to receive an optical fiber cable and to hold the ferrule holder, a connector body configured to hold the connector sub-assembly, a shroud configured to encircle the connector body, and a housing configured to encircle a portion of the shroud. The connector body is configured to include a first mating member and a second mating member. The first mating member is configured to include a cantilevered flange, and the second mating member is configured to include a groove on an inner surface of the second mating member. The cantilevered flange is configured to engage with the groove to securely fasten the first mating member with the second mating member.

22 Claims, 24 Drawing Sheets

(56) References Cited

U.S. PATENT DOCUMENTS

| | | |
|---|---|---|
| 2008/0175541 A1 | 7/2008 | Lu et al. |
| 2009/0148101 A1* | 6/2009 | Lu .................. G02B 6/3877 385/56 |
| 2011/0280521 A1 | 11/2011 | Kachmar |
| 2017/0261699 A1 | 9/2017 | Compton et al. |

OTHER PUBLICATIONS

International Preliminary Report on Patentability dated Nov. 10, 2020 in corresponding International Application No. PCT/US2019/031223, 5 pages.

* cited by examiner

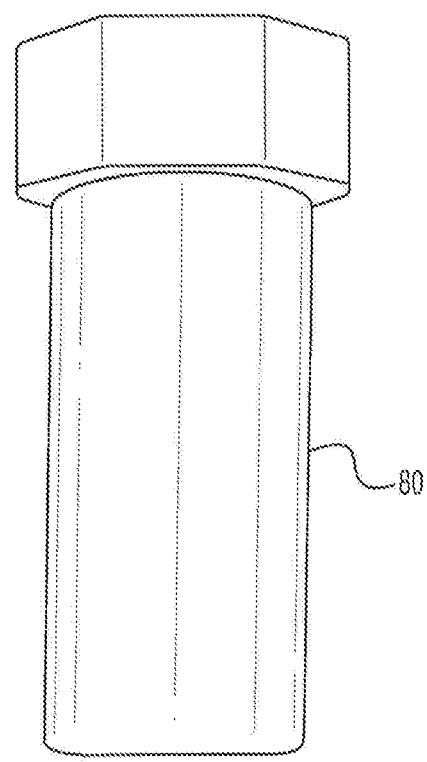
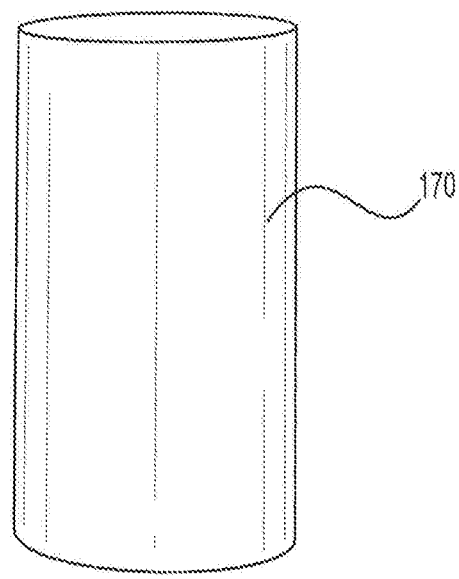
FIG. 15

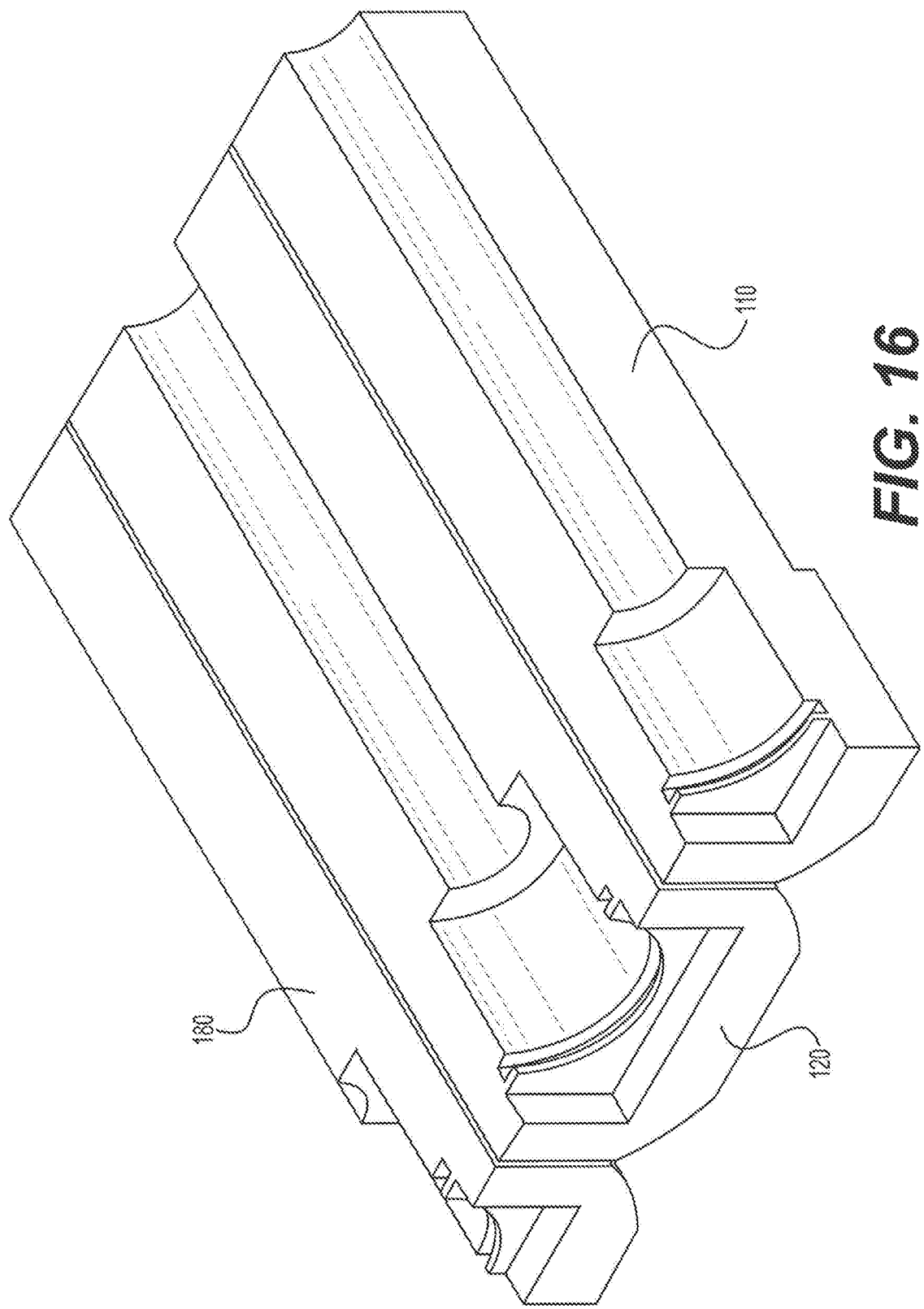

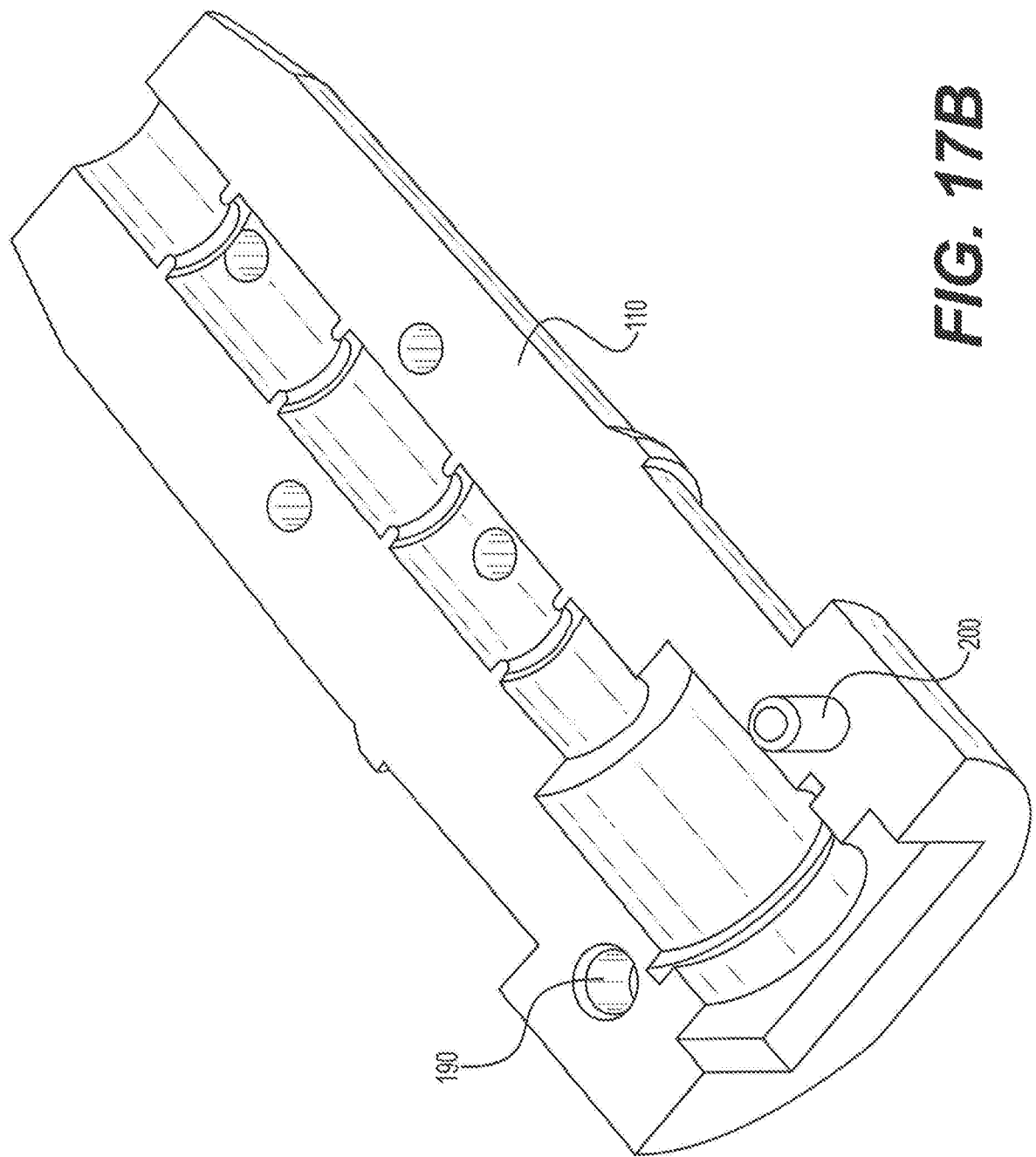

FIBER OPTICAL CONNECTOR WITH CABLE RETENTION FEATURE

CROSS-REFERENCE TO RELATED APPLICATION

This nonprovisional application claims the benefit of U.S. Provisional Application No. 62/646,988, filed May 7, 2018. The disclosure of the prior application is hereby incorporated by reference herein in its entirety.

TECHNICAL FIELD

The present disclosure is directed to a fiber optic connector and, more particularly, to a hardened fiber optic connector having a cable retention feature.

BACKGROUND

As demand for data and connectivity increases, network planners and installers are seeking more efficient and cost-effective deployment options for their fiber to the X (FTTX) rollouts. FTTX comprises the many variants of fiber optic access infrastructure. These include fiber to the home (FTTH), fiber to the premise (FTTP), fiber to the building (FTTB), fiber to the node (FTTN), and fiber to the curb or cabinet (FTTC). The optical FTTP or FTTH network is an optical access network that supplies broadband or ultra-broadband communication services to a number of end users (e.g., services that require data transmission speeds measuring several hundred Mbit/s or even higher).

Within the communication systems, fiber optic connectors are used to easily connect and disconnect optical fibers of mating connectors together without splicing the fibers. Typical fiber optic connectors include a ferrule that supports an end portion of an optical fiber. When two fiber optical connectors are interconnected, end faces of the ferrules, on each connector, directly oppose one another. Thus, the optical fibers, which are supported by each ferrule, are also directly opposed to each other. Furthermore, springs in each connector bias the optical fibers towards each other when the connectors are in this interconnected state. An optical signal can then be transmitted from one optical fiber to the other optical fiber.

It may be desirable to provide a hardened optical fiber connector that overcomes one or more problems of conventional prior art connectors that are recognized by persons having ordinary skill in the art

SUMMARY

In accordance with various aspects of the disclosure, a fiber optic connector includes a ferrule holder configured to receive a ferrule that terminates an optical fiber cable, a connector sub-assembly configured to receive an optical fiber cable and to hold the ferrule holder, a connector body configured to hold the connector sub-assembly, a shroud configured to encircle the connector body, and a housing configured to encircle a portion of the shroud. The connector body is configured to include a first mating member and a second mating member. The first mating member is configured to include a cantilevered flange, and the second mating member is configured to include a groove on an inner surface of the second mating member. The cantilevered flange is configured to engage with the groove to securely fasten the first mating member with the second mating member.

In some aspects, a preconnectorized cable includes a fiber optic cable and the aforementioned fiber optic connector attached to the fiber optic cable.

According to various aspects of the disclosure, a connector body for a fiber optic connector includes a first mating member and a second mating member coupled with the first mating member. The first mating member is configured to include a cantilevered flange, and the second mating member is configured to include a groove on an inner surface of the second mating member. The cantilevered flange is configured to engage with the groove to securely fasten the first mating member with the second mating member.

BRIEF DESCRIPTION OF THE DRAWINGS

For a further understanding of the disclosure, reference will be made to the following detailed description of the invention which is to be read in connection with the accompanying drawing and in which like numbers refer to like parts, wherein:

FIG. 15 is another diagrammatic illustration showing a portion of the exemplary connector of FIG. 1;

FIG. 16 is another diagrammatic illustration showing a portion of the exemplary connector of FIG. 1; and FIGS. 17A and 17B are diagrammatic illustrations showing portions of the exemplary connector of FIG. 1.

DETAILED DESCRIPTION OF EMBODIMENTS

As a preface to the detailed description, it should be noted that, as used in this specification and the appended claims, the singular forms "a," "an," and "the" include plural referents, unless the context clearly dictates otherwise.

Figure 1:
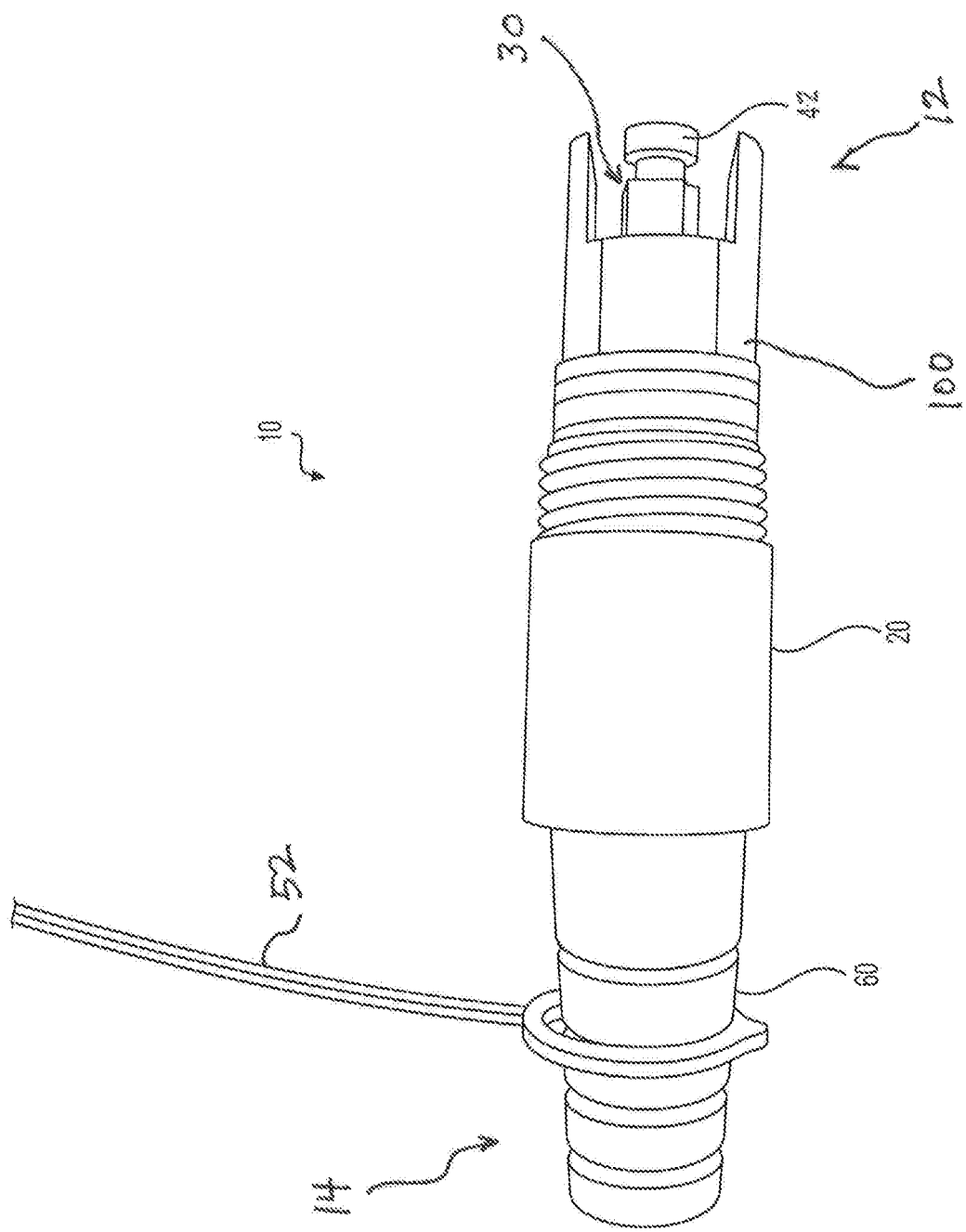
FIG. 1 is a side view of an exemplary hardened fiber optic connector in accordance with various aspects of the disclosure.

FIG. 1 is a side view of an exemplary hardened fiber optic connector 10 for connecting optical fibers of a fiber optic network. The connector 10 includes a housing 20, a shroud 100, and a connector sub-assembly 30, for example, an SC connector sub-assembly. FIG. 1 shows the connector sub-assembly 30 with a dust cap 42 covering a ferrule 40 (FIG. 3), and FIG. 2 shows a protective cap 50 disposed over the forward end 12 of the connector 10 to provide additional protection of the ferrule 40.

Figure 2:
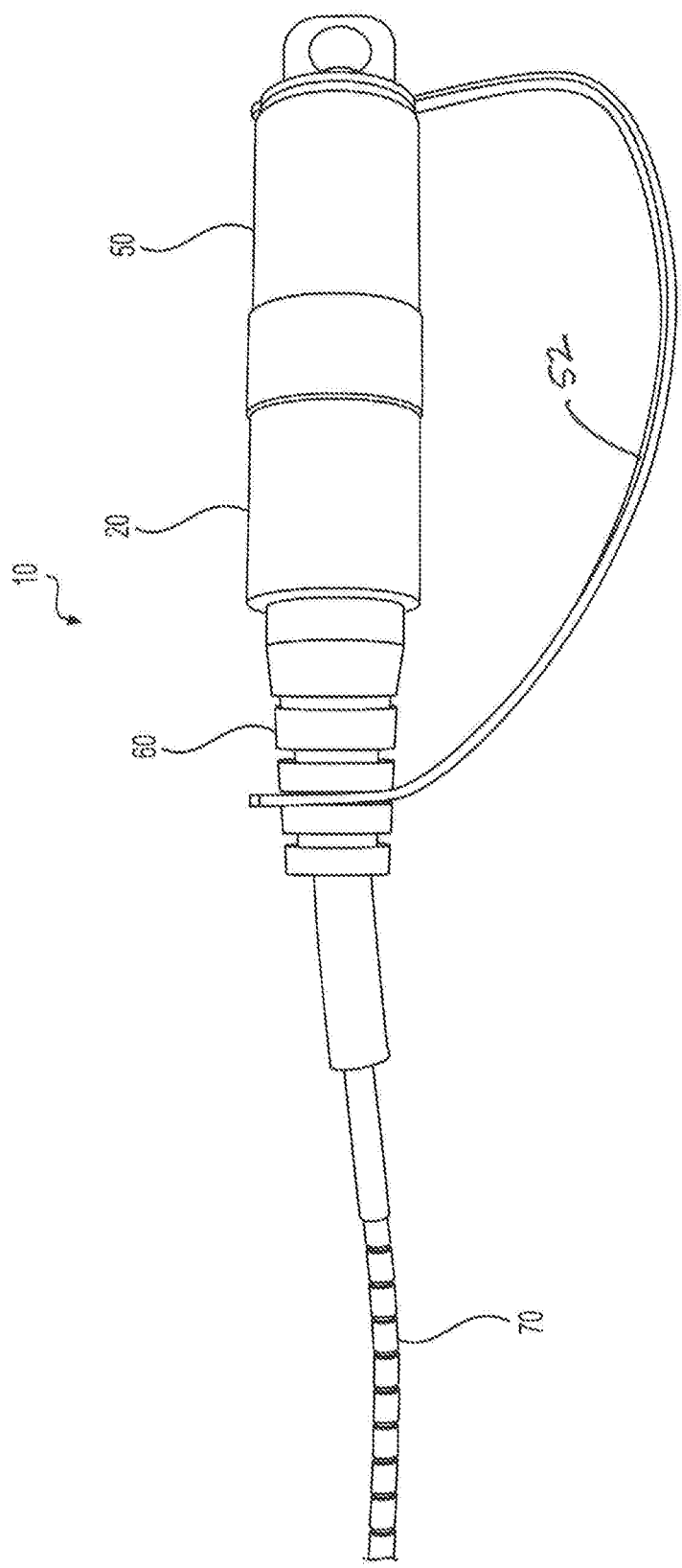
FIG. 2 is a side view of the exemplary connector of FIG. 1 with a protective cap attached.

As shown in FIG. 2, the connector 10 is attached to an optical fiber cable 70. A rearward end 14 of the connector 10 includes a boot 60 through which the optical fiber cable 70 extends. The boot 60 is a flexible member that generally inhibits kinking and provides bending strain relief to the cable near the housing 20. The protective cap 50 may be secured to the boot 60 by a wire assembly 52. In some aspects, the boot 60 may be formed from a flexible material such as KRAYTON.

Figure 3:
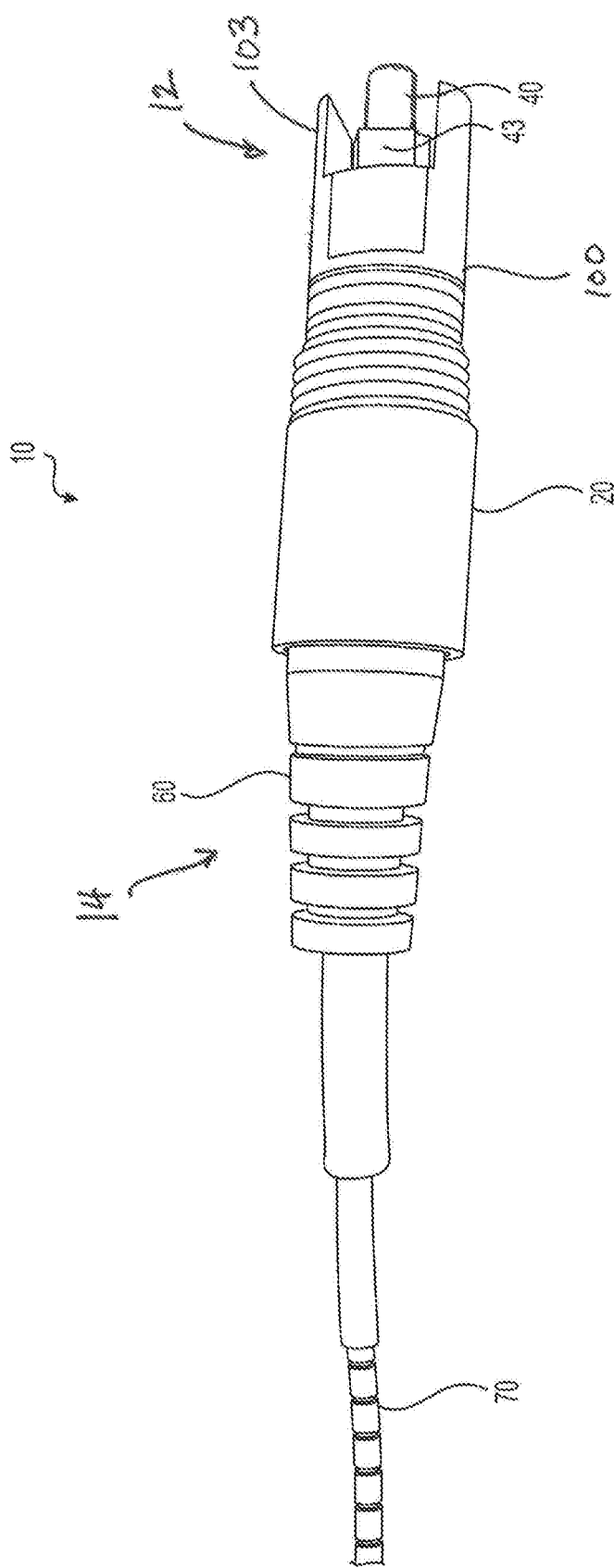
FIG. 3 is a side view of the exemplary connector of FIG. 1 with the ferrule exposed.

The optical fiber cable 70, in some embodiments, holds a single strand of 125 µm diameter single mode optical fiber, which may be protected by buffering layers and an outer sheath. The optical fiber is terminated by ferrule 40 in a manner well-known to those skilled in the art, as shown in FIG. 3. The ferrule 40 is a ceramic ferrule that is attached to a ferrule holder 43.

Figure 4:
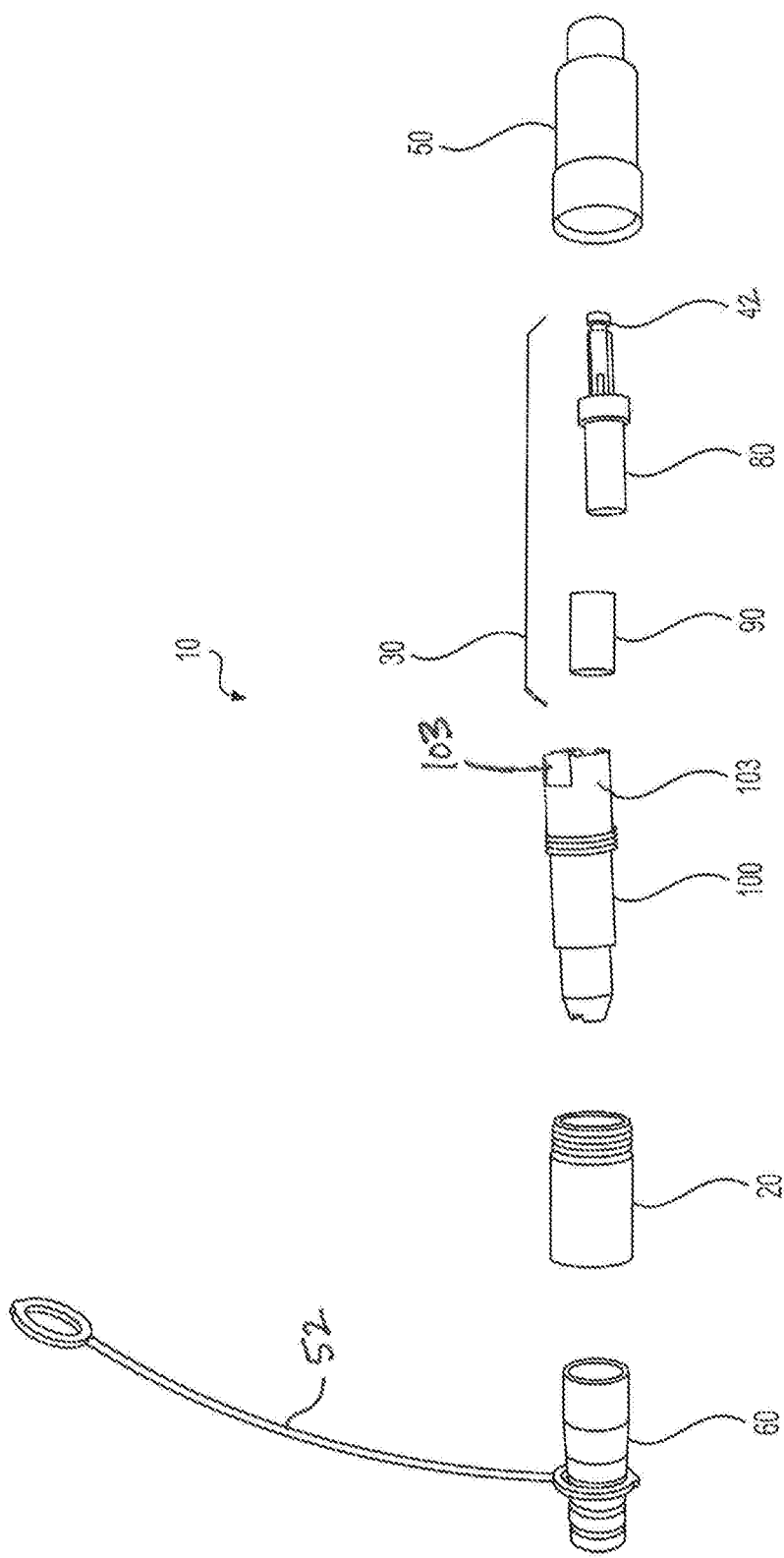
FIG. 4 is an exploded view of the exemplary connector of FIG. 1.
Figure 11A:
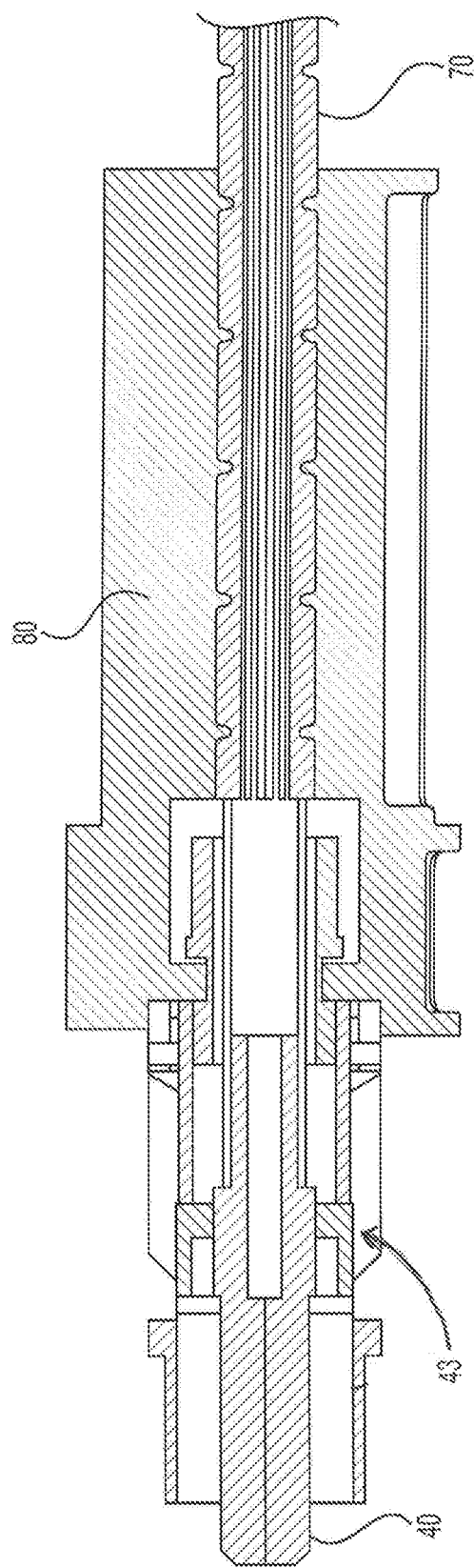
FIGS. 11A and 11B are cross-sectional views of the exemplary connector of FIG. 1.
Figure 11B:
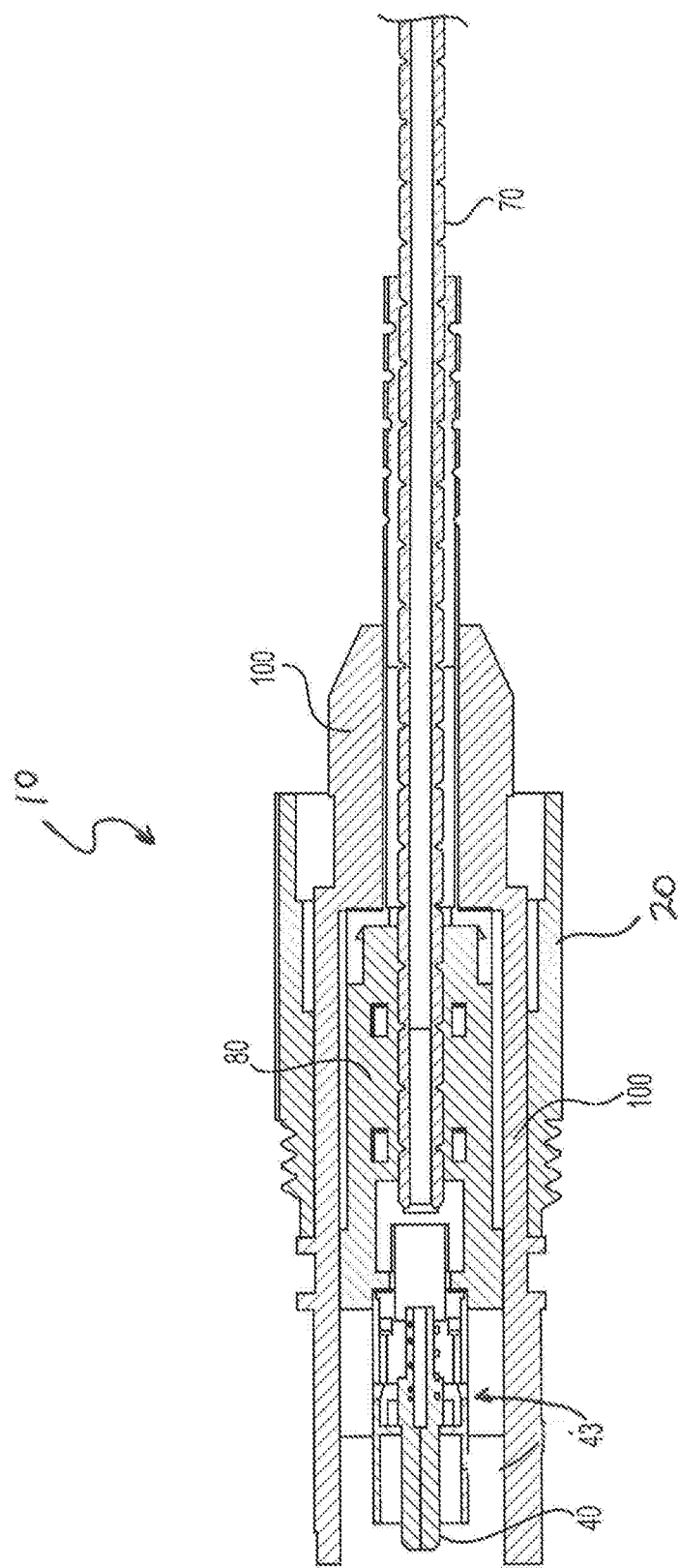

In the exploded view of FIG. 4, ferrule housing sub-assembly 30 includes a connector body 80 that is attached to ferrule holder 43 (FIGS. 11A, 11B). The connector body 80 is disposed radially outward of the ferrule holder 43. An optional metal sleeve 90 may be disposed over the connector body 80, and the shroud 100 may be disposed over the optional metal sleeve 90. The shroud 100 may include arms 103 in order to provide a degree of axial movement for shroud 100 and to provide a keying relationship with a receptacle (not shown). Such allows a helical spring (not shown) to bias the ferrule 40 forwards during a conventional push-pull optical interconnection with a receptacle or other optical interface.

Ferrule housing sub-assembly 30 may be, for example, a "Subscriber Connector" or SC connector, as originally developed by NTT®. SC connectors have convenient push/pull style mating that allow for push/pull engagement/disengagement with a mating optical fiber socket.

Referring again to FIG. 4, the housing 20 may be a tubular member that is configured to be disposed over and around at least a portion of the shroud 100 and the ferrule housing sub-assembly 30 within the shroud 100. Thus, an inner lumen may extend the entire length of housing 20 such that housing 20 has open ends along its longitudinal axis. Similarly, the connector body 80 may be a tubular member that is disposed at least partly over and around ferrule holder 43. Thus, an inner lumen may also extend the entire length of the connector body 80 such that the connector body 80 has open ends along its longitudinal axis. Furthermore, the optional metal sleeve 90 may be disposed over the connector body 80 in order to secure the connector body 80 in place.

Figure 5:
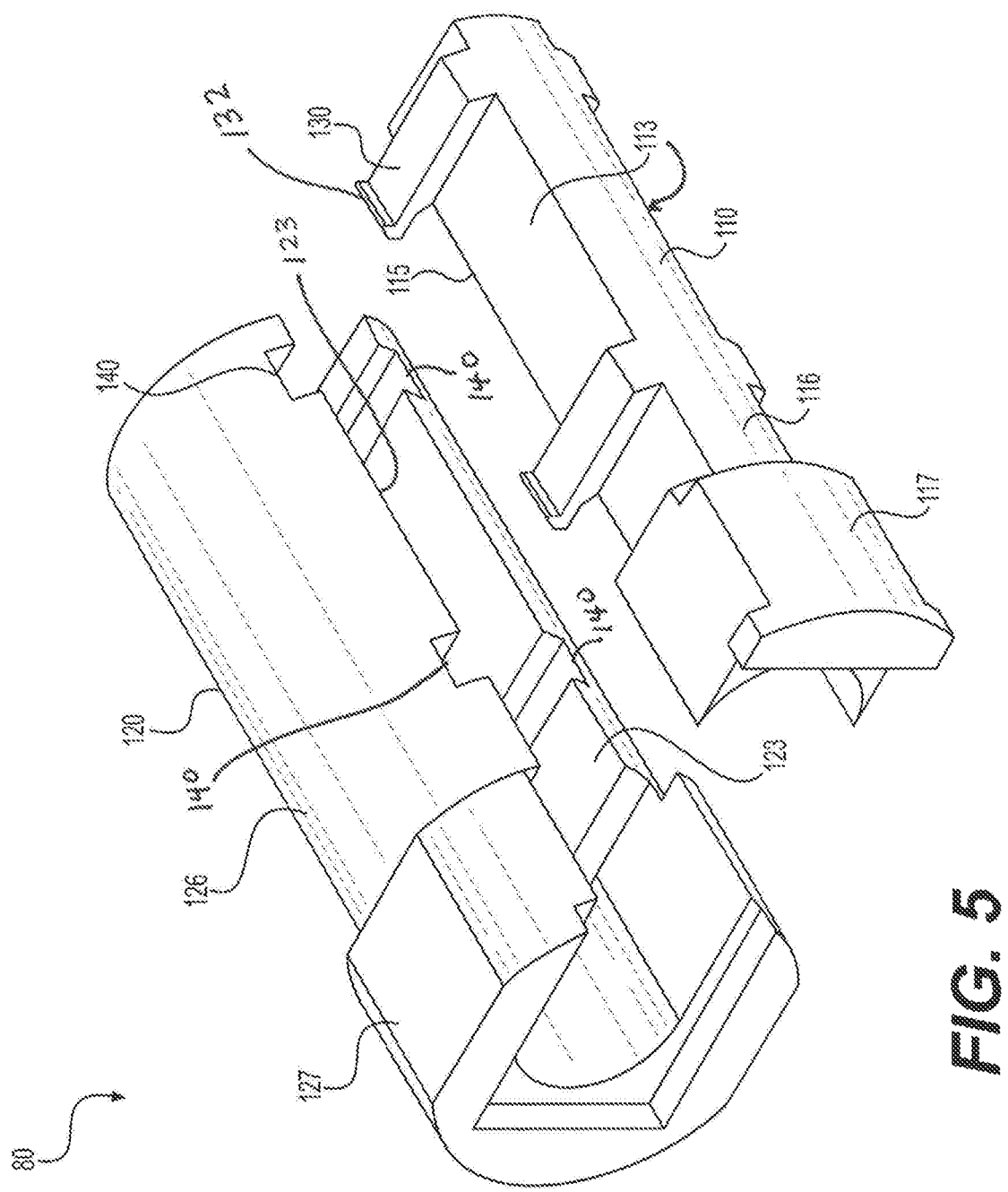
FIG. 5 is another diagrammatic illustration showing a portion of the exemplary connector of FIG. 1.

As shown in FIG. 5, in some embodiments, the connector body 80 may include a first mating member 110 and a second mating member 120. When assembled together, first mating member 110 and second mating member 120 may form a complimentary mating arrangement, such as an interference fit. As illustrated in FIG. 5, the circumferential length of first mating member 110 is less than a circumferential length of second mating member 120. For example, in some embodiments, the first mating member 110 may be about ¼ of a total circumference of the connector body 80 and the second mating member 120 may be about ¾ of the total circumference of the connector body 80. In other embodiments, the first mating member 110 may be about ⅓ of the total circumference and second mating member 120 may be about ⅔ of the total circumference. It is also contemplated that the first mating member 110 is, for example, about ⅕ of the total circumference and that second mating member 120 is about ⅘ of the total circumference. It should be appreciated that other proportions of the total circumference may be apportioned to the first and second mating members 110, 120.

The first mating member 110 includes cantilevered flanges 130 on opposite outer side surfaces 113 of the first mating member 110. The flanges 130 may protrude in opposite directions from the outer side surfaces 113 of the first mating member 110 and terminated in raised prongs 132 that protrude from the flanges 130 in a radially outward direction of the connector body. Additionally, the flanges 130 may protrude radially inward from an inner surface 115 of the first mating member 110 such that the flanges 130 extend beyond the inner surface 115. The flanges 130 engage with opposing grooves 140 of radial inner surfaces 123 on the second mating member 120. The grooves 140 may form a notch within radial inner surface 123 of the second mating member 120.

The flanges 130 and the grooves 140 may form a snap-fit connection to secure first mating member 110 with second mating member 120. For example, each of the grooves 140 may define a shoulder 142 at an end opposite to the groove opening shown in FIG. 5. The flanges 130 are configured to deflect radially inward as they are inserted through the grooves 140 and then snap-fit back to their undeflected configuration when they reach the end of the grooves 140 such that the raised prongs 132 engage the shoulder 142 of the grooves so that the first and second mating members 110, 120 are secured together. The snap-fit connection may be the only attachment means to secure the first and second mating members 110, 120 together. Alternatively or additionally, the first and second mating members 110, 120 may be attached with another attachment means, such as a hinge assembly, a releasable lock assembly, or the metal sleeve 90.

Figure 6A:
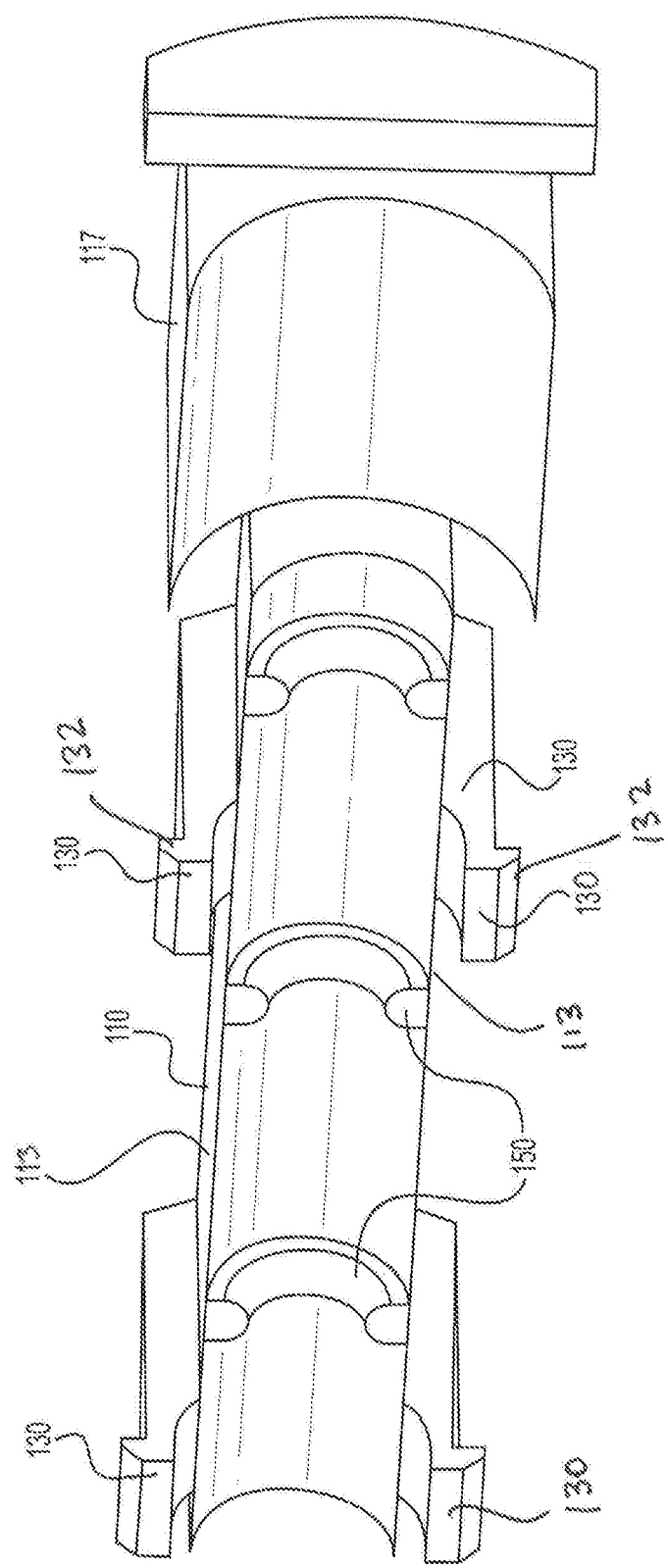
FIG. 6A is another diagrammatic illustration showing a portion of the exemplary connector of FIG. 1.
Figure 6B:
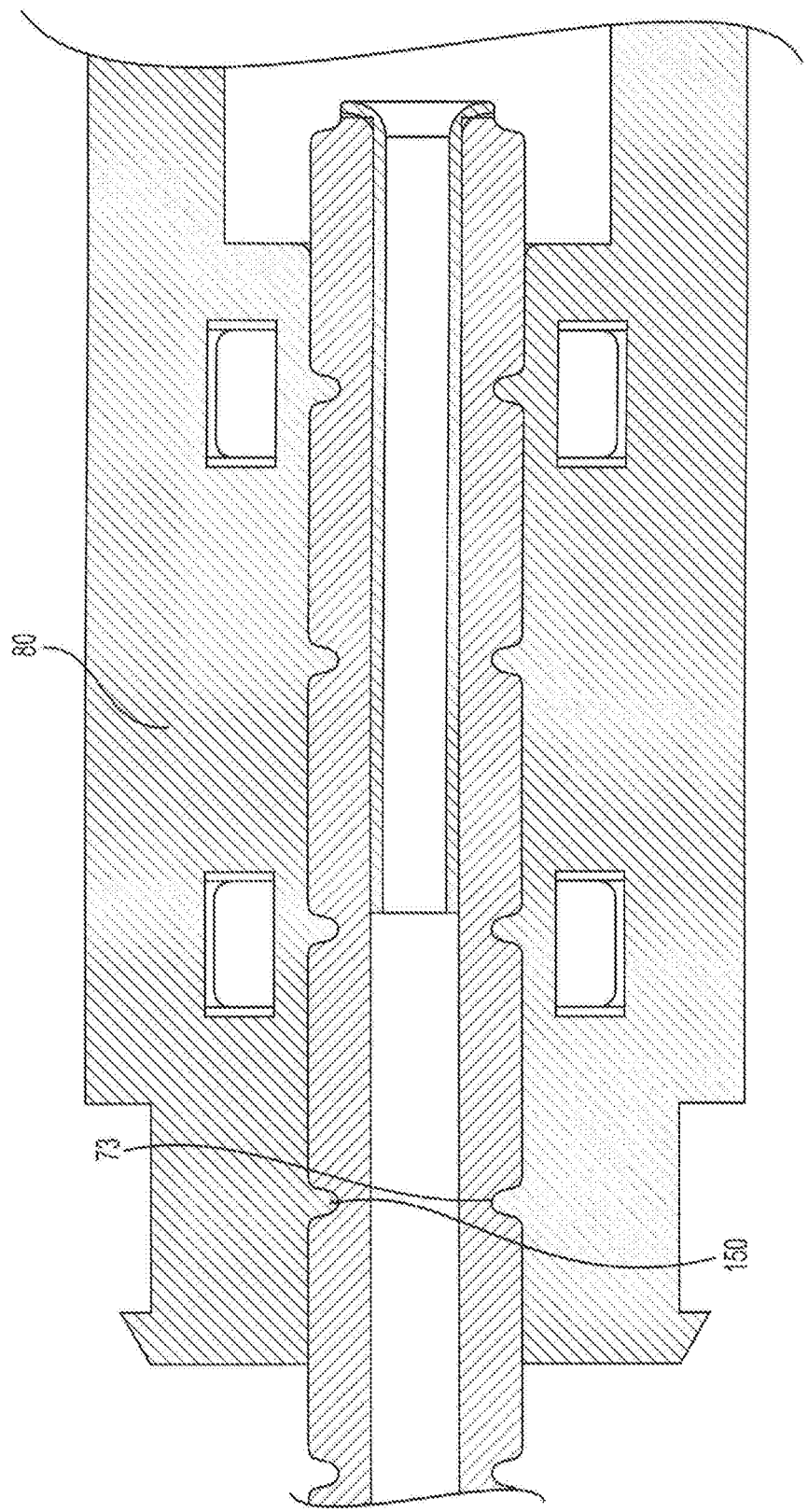
FIG. 6B is a cross-sectional view showing a portion of the exemplary connector of FIG. 1.

In some embodiments, the first mating member 110 and/or the second mating member 120 may include protrusions 150 on inner surfaces, as shown in FIGS. 6A and 6B. The protrusions 150 may extend radially inward from the inner surfaces of the first mating member 110 and/or the second mating member 120. Thus, the protrusions 150 may extend circumferentially along the inner surfaces of first mating member 110 and/or second mating member 120. In some embodiments, the protrusions 150 may extend the entire circumferential length of first mating member 110 and second mating member 120. In other embodiments, the protrusions 150 extend less than the entire circumferential length. The protrusions 150 may be used to help retain optical fiber cable 70 within connector 10. For example, the protrusions 150 may be sized and arranged to interact with grooves 73 on the optical fiber cable 70, for example, a Miniflex® optical cable, to restrict and/or prevent forward and backward longitudinal movement of optical fiber cable 70 within connector 10. The optical fiber cable 70 may still be able to rotate radially within connector 10 when protrusions 150 are engaged with grooves 73 on optical fiber cable 70.

Figure 6C:
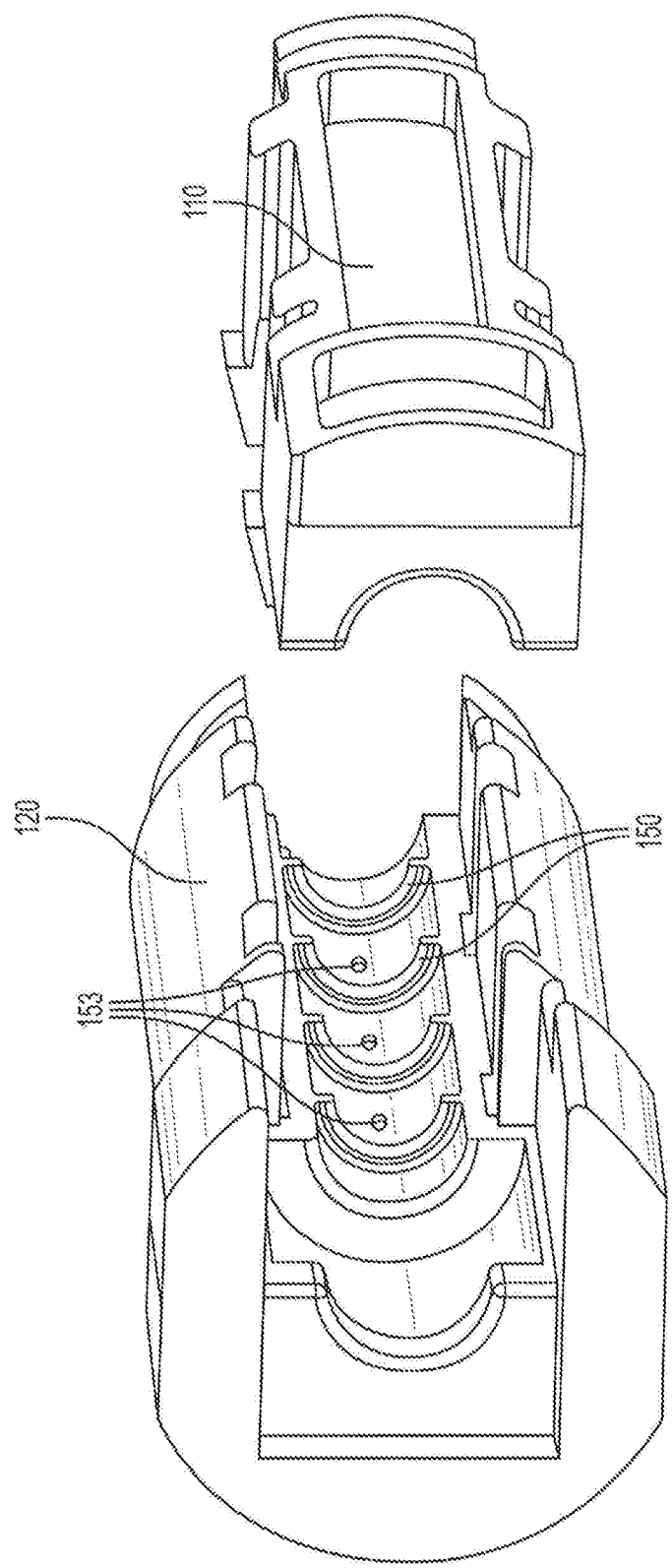
FIG. 6C is another diagrammatic illustration showing a portion of the exemplary connector of FIG. 1.
Figure 6D:
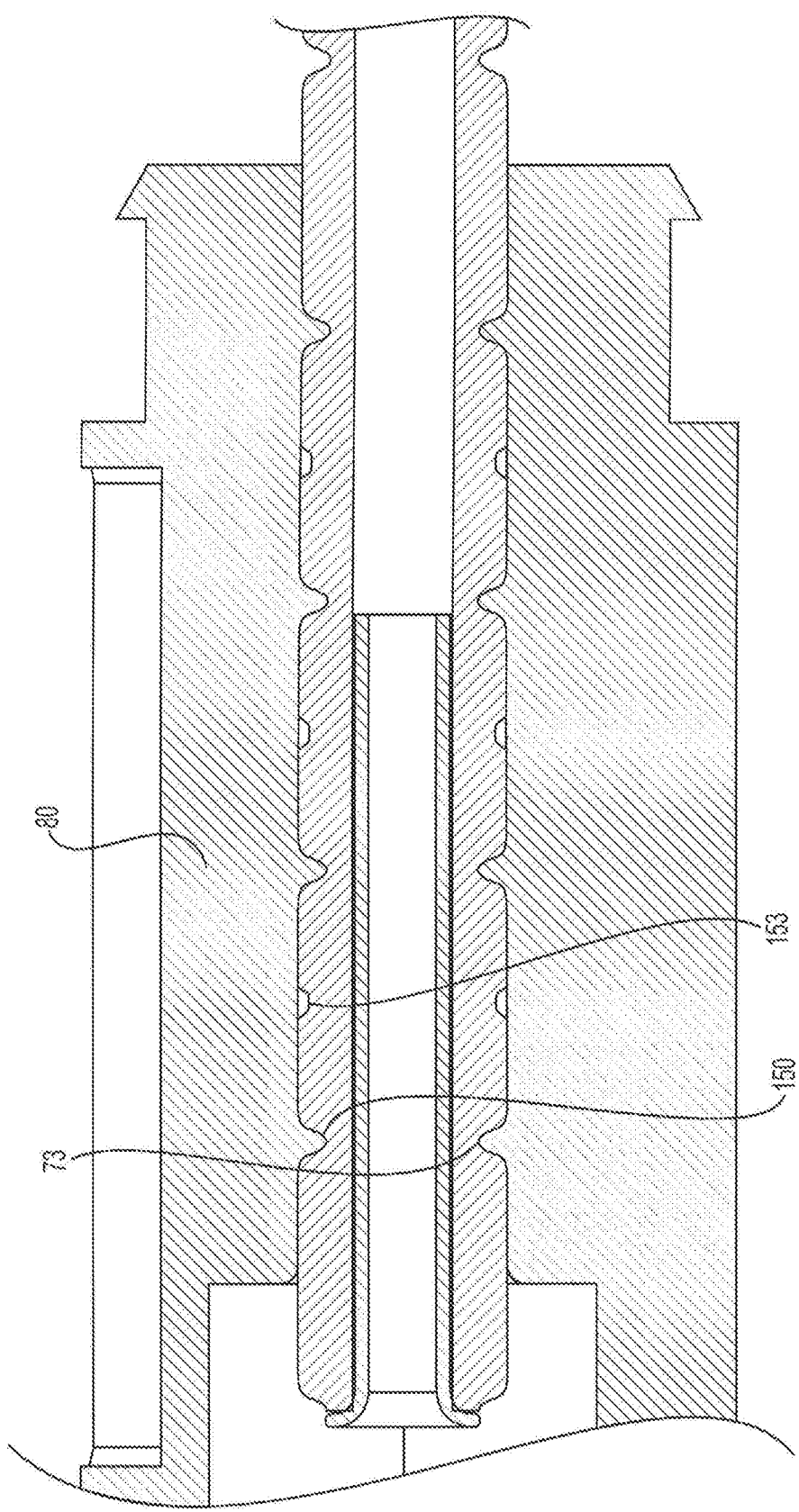
FIG. 6D is a cross-sectional view showing a portion of the exemplary connector of FIG. 1.
Figure 7B:
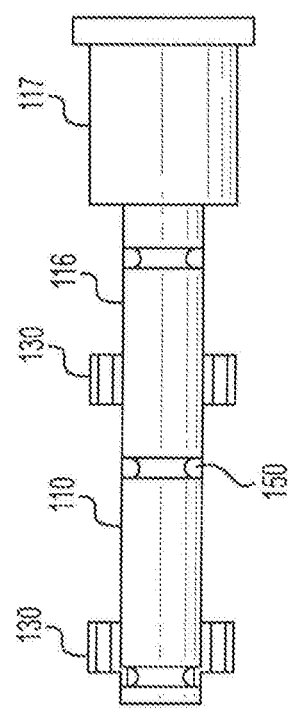
FIGS. 7A and 7B are diagrammatic illustrations showing a portion of the exemplary connector of FIG. 1.
Figure 7A:
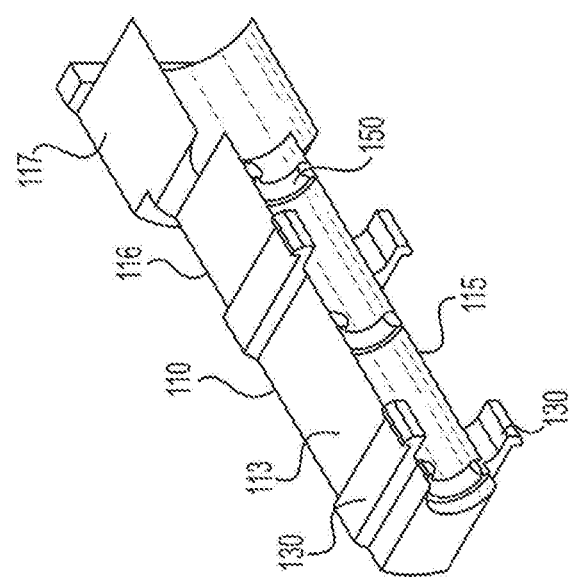
Figure 8:
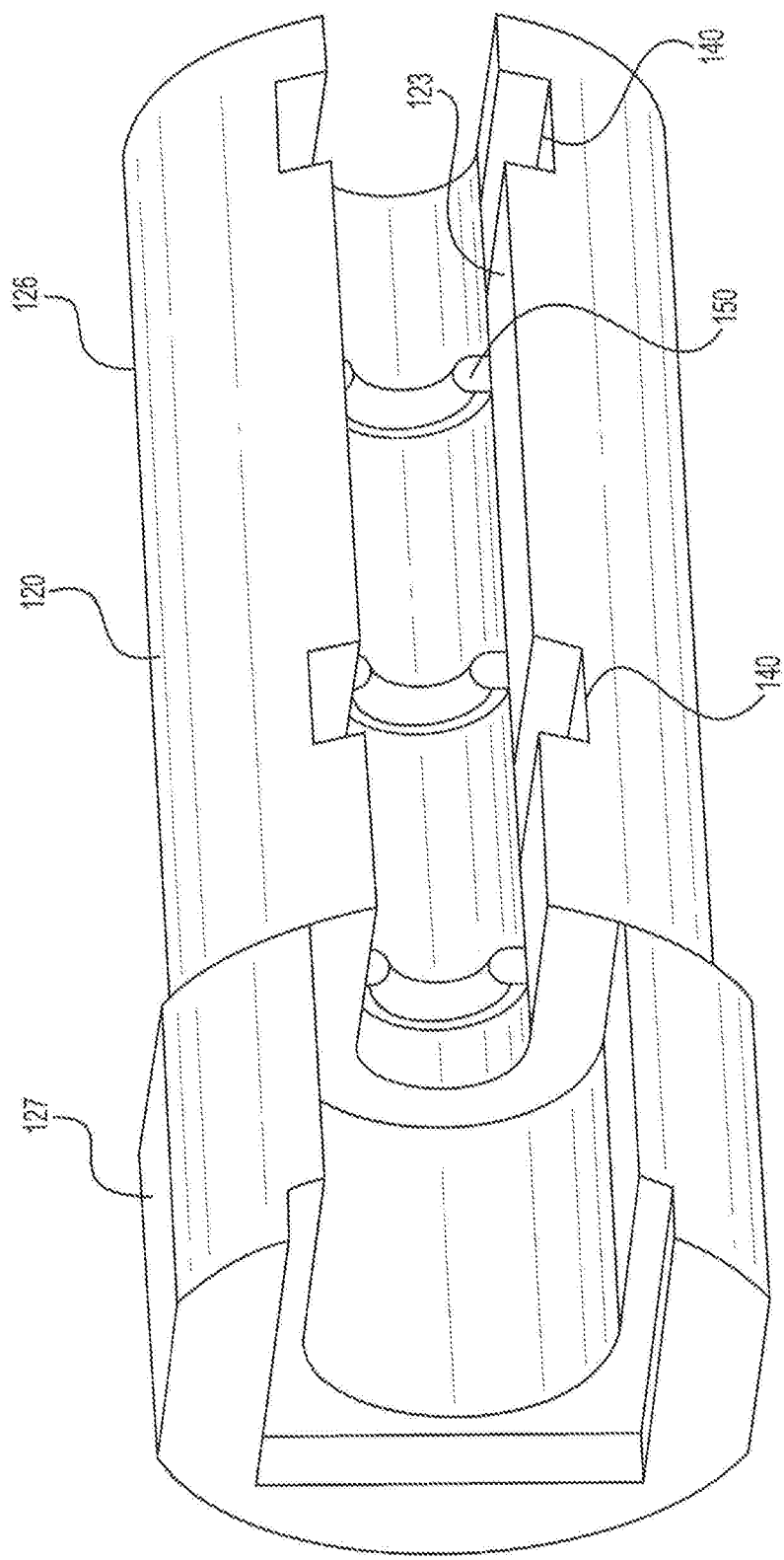
FIG. 8 is another diagrammatic illustration showing a portion of the exemplary connector of FIG. 1.
Figure 9B:
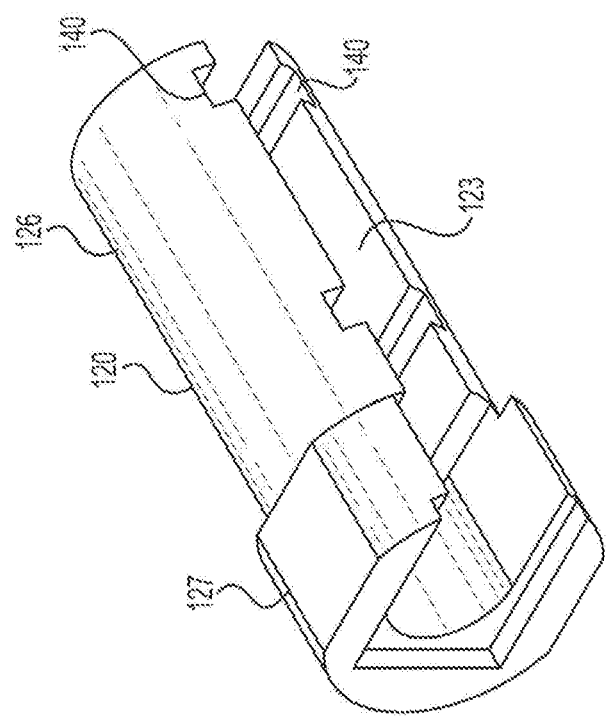
FIGS. 9A and 9B are diagrammatic illustrations showing a portion of the exemplary connector of FIG. 1.
Figure 9A:
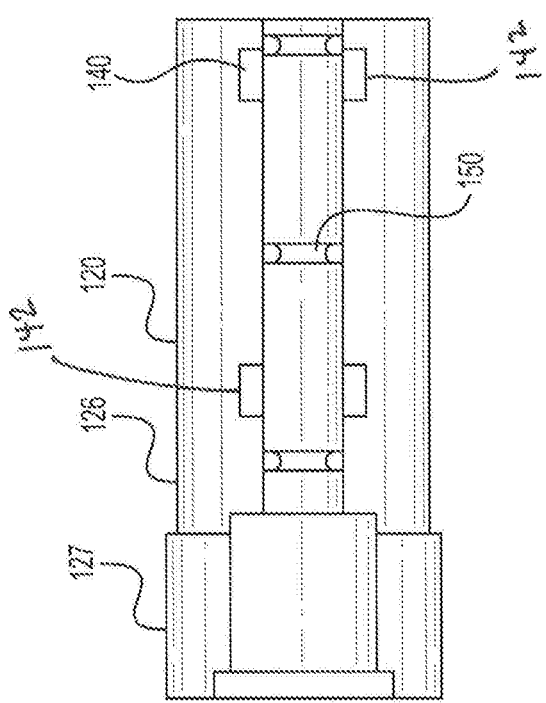

In some embodiments, as shown in FIGS. 6C and 6D, the first mating member 110 and/or the second mating member 120 may include protrusions 150 and raised portions 153.

Although FIG. 6C only shows raised portions 153 on second mating member 120, it is also envisioned that raised portions 153 may be provided on first mating member 110. Raised portions 153 may interact with an outer surface of optical fiber cable 70 to prevent/reduce cable 70 from rotating radially within connector 10. Thus, raised portions 153 may frictionally engage with the outer surface of optical fiber cable 70 to prevent/reduce such radially rotation of optical fiber cable 70. Therefore, both lateral and radial movement of optical fiber cable 70 may be prevented due to protrusions 150 and raised portions 153. Raised portions 153 may be of, for example, triangular, square, circular, or elliptical shape. One or more raised portions 153 may be disposed between each protrusion 150 on connector 10. Additionally, raised portions 153 may be evenly spaced apart or spaced apart at random intervals. It is also envisioned that connector 10 may include only raised portions 153 and not protrusions 150.

An outer profile of first mating member 110 may include a first portion 116 and a second portion 117. As shown in FIGS. 5-9B, the second portion 117 extends radially and circumferentially outward of the first portion 116 so that second portion 117 protrudes outward from first portion 116. Similarly, an outer profile of second mating member 120 may include a first portion 126 and a second portion 127 so that second portion 127 protrudes outward from first portion 126. Second portion 117 and second portion 127 may help to retain an outer housing 20 on the connector 10, as discussed further below.

Figure 10A:
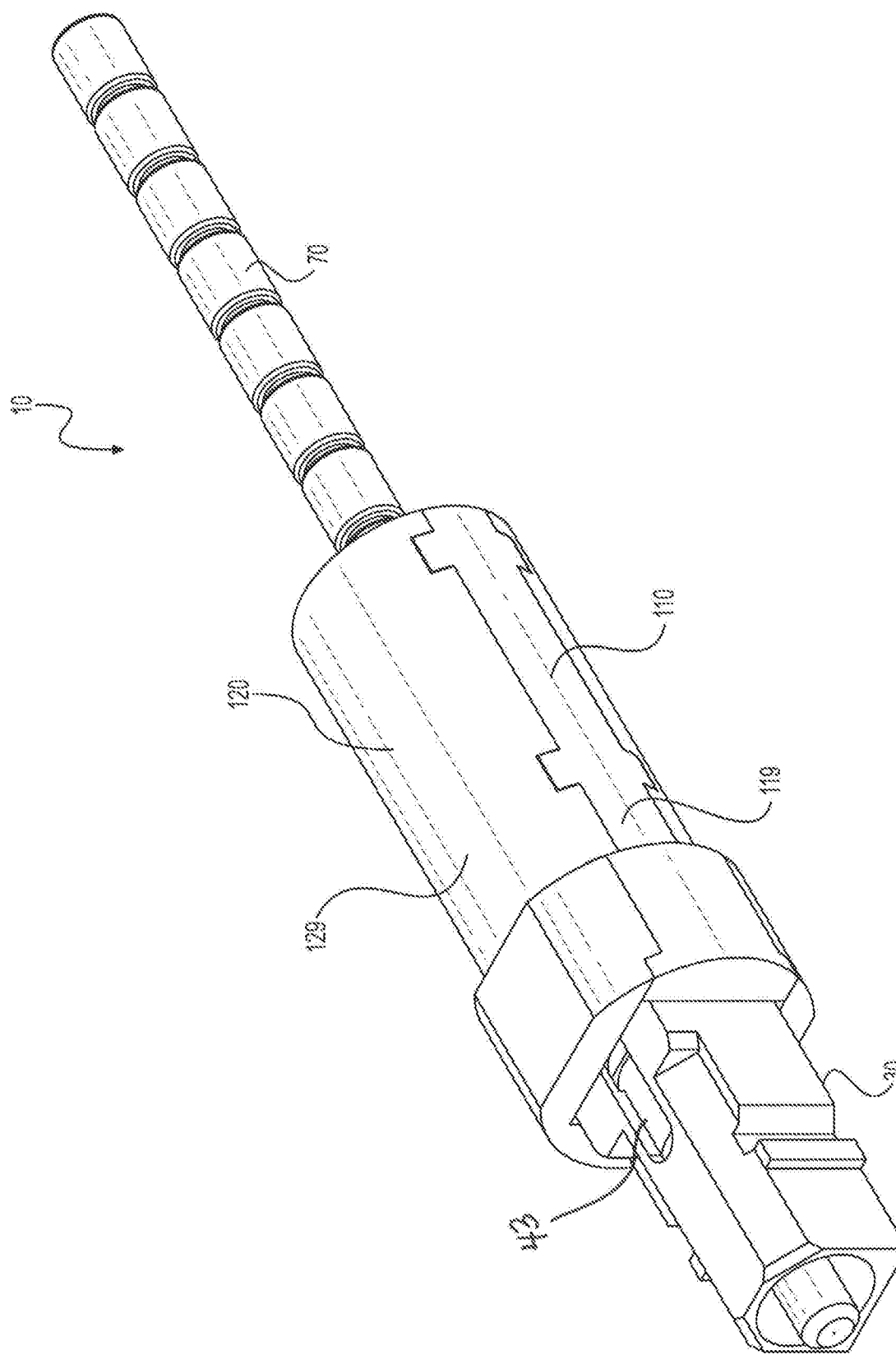
FIGS. 10A and 10B are diagrammatic illustrations of the exemplary connector of FIG. 1.

When assembled, as shown in FIG. 10A, first mating member 110 and second mating member 120 may form a continuous circumferential member. Thus, an outer circumferential surface 119 of first mating member 110 may be continuous with an outer circumferential surface 129 of second mating member 120. Accordingly, first mating member 110 and second mating member 120 may form a water-tight seal that prevents water, or other substances, from leaking into connector 10. The water-tight seal may also provide a barrier against moisture.

Figure 10B:
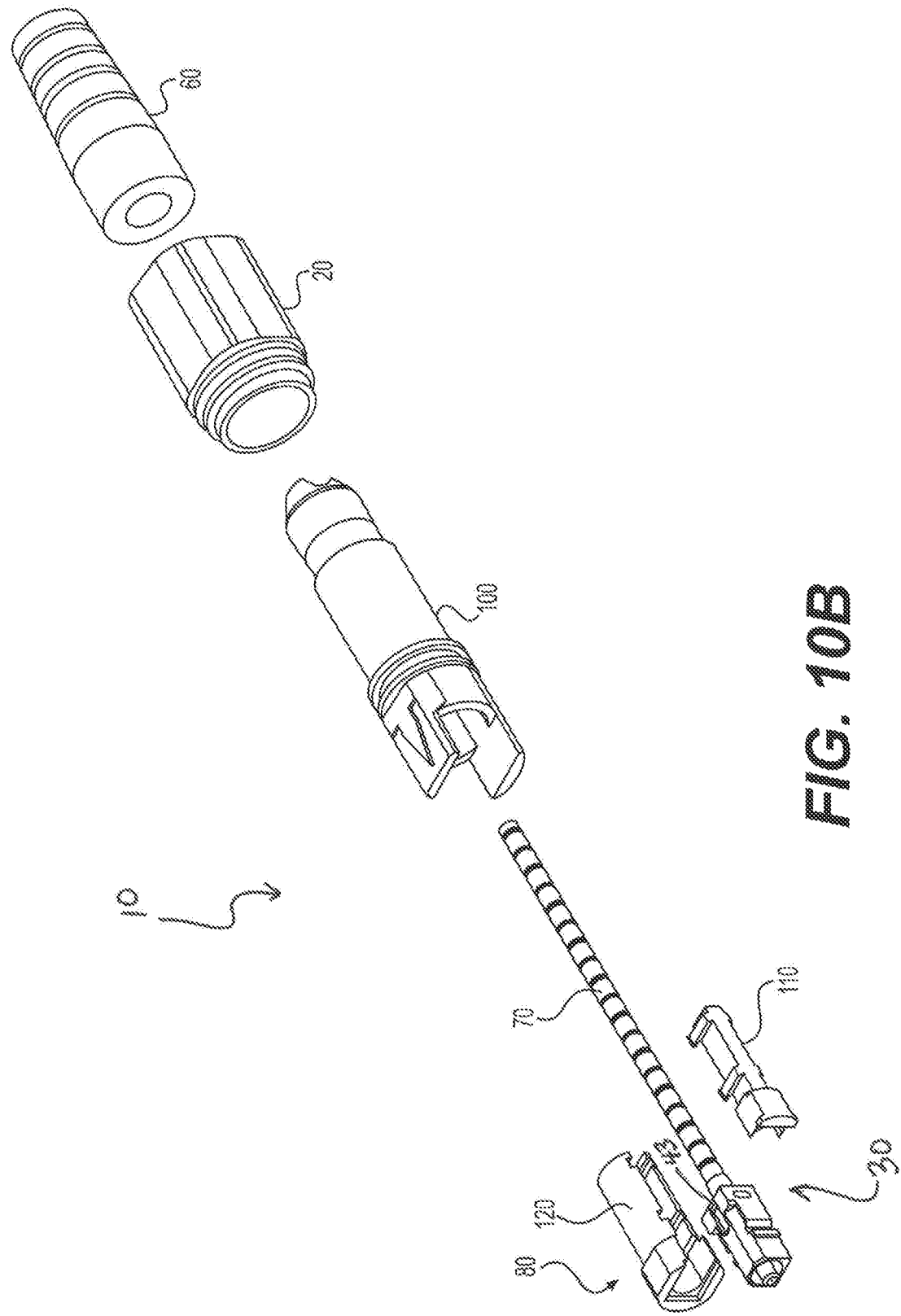

FIG. 10B shows an exploded view of the assembled system. As shown in FIG. 10B, the first mating member 110 and the second mating member 120 form the connector body 80, which is disposed over and around the optical fiber cable 70. Additionally, the first mating member 110 and the second mating member 120 are disposed at least partly over and around the ferrule holder 43. The shroud 100 may then be disposed over and around the connector body 80. As discussed above, shroud 100 is then attached to housing 20 and boot 60.

As shown in FIGS. 10A-11B, the first mating member 110 and the second mating member 120 form a continuous lumen there-through such that the optical fiber cable 70 extends from one end of the lumen and the ferrule housing sub-assembly 30 extends from the other end of the lumen. FIG. 11A shows the system without the shroud 100, and FIG. 11B shows the system with the shroud 100 disposed over and around the connector body 80.

Figure 12:
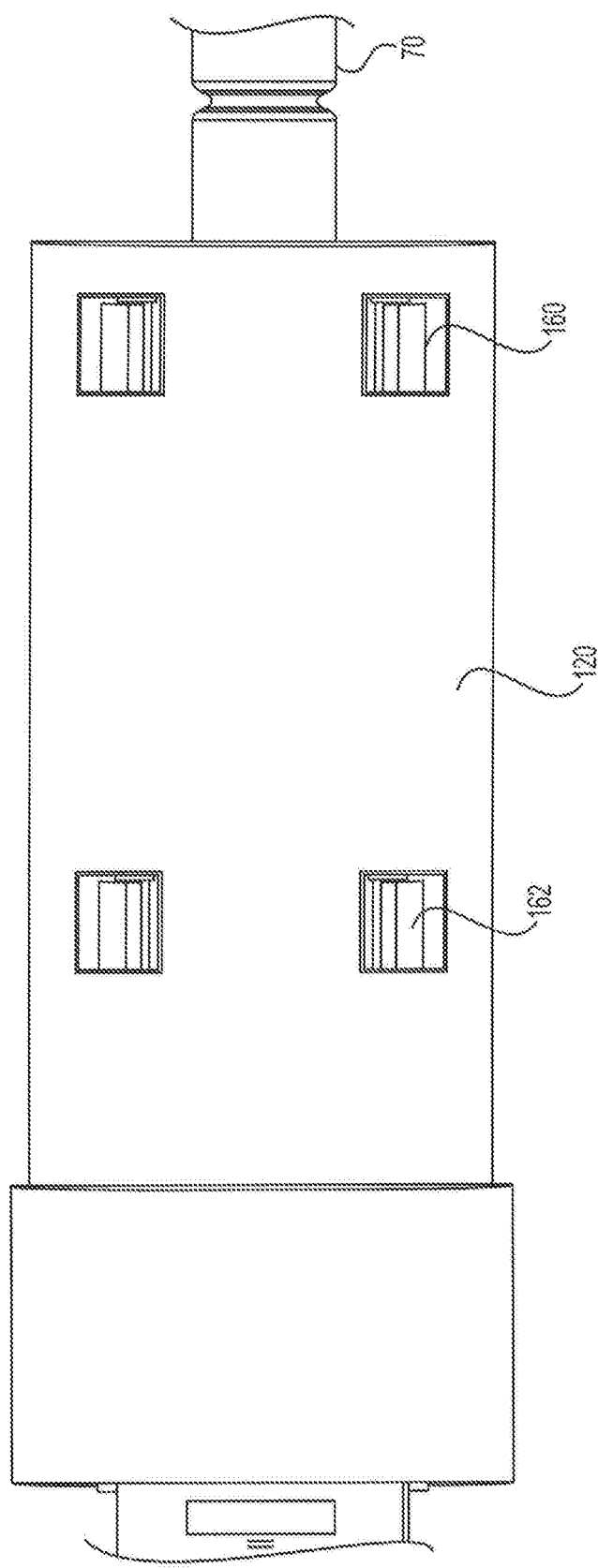
FIG. 12 is another diagrammatic illustration showing a portion of the exemplary connector of FIG. 1.

A bottom portion of second mating member 120 may include notches 160, as shown in FIG. 12. Notches 160 may be used for connection to flanges 130 on first mating member 110. Thus, flanges 130 may each extend through a notch 160 such that a lip 132 of each flange (FIG. 6) latches onto a shoulder 162 of each notch 160 (FIG. 12). The connection between lip 132 and shoulder 162 may secure flanges 130 within grooves 140. Furthermore, the connection between lip 132 and shoulder 162 may only be released by a radially inward movement of flanges 130. Accordingly, a user may be required to push flanges 130 radially inward in order to detach the connection between lip 132 and shoulder 162.

Figure 13:
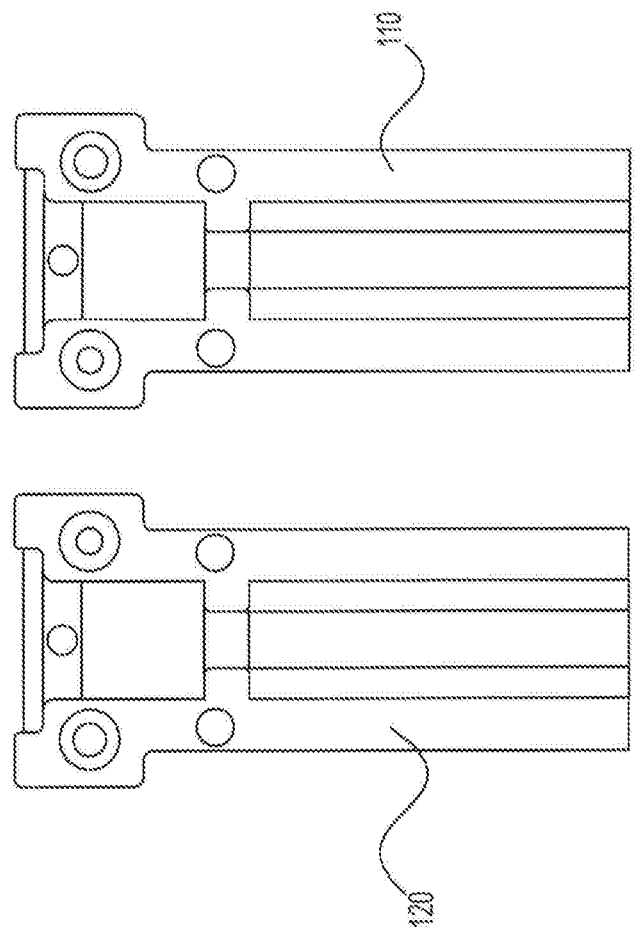
FIG. 13 is another diagrammatic illustration showing a portion of the exemplary connector of FIG. 1.
Figure 14A:
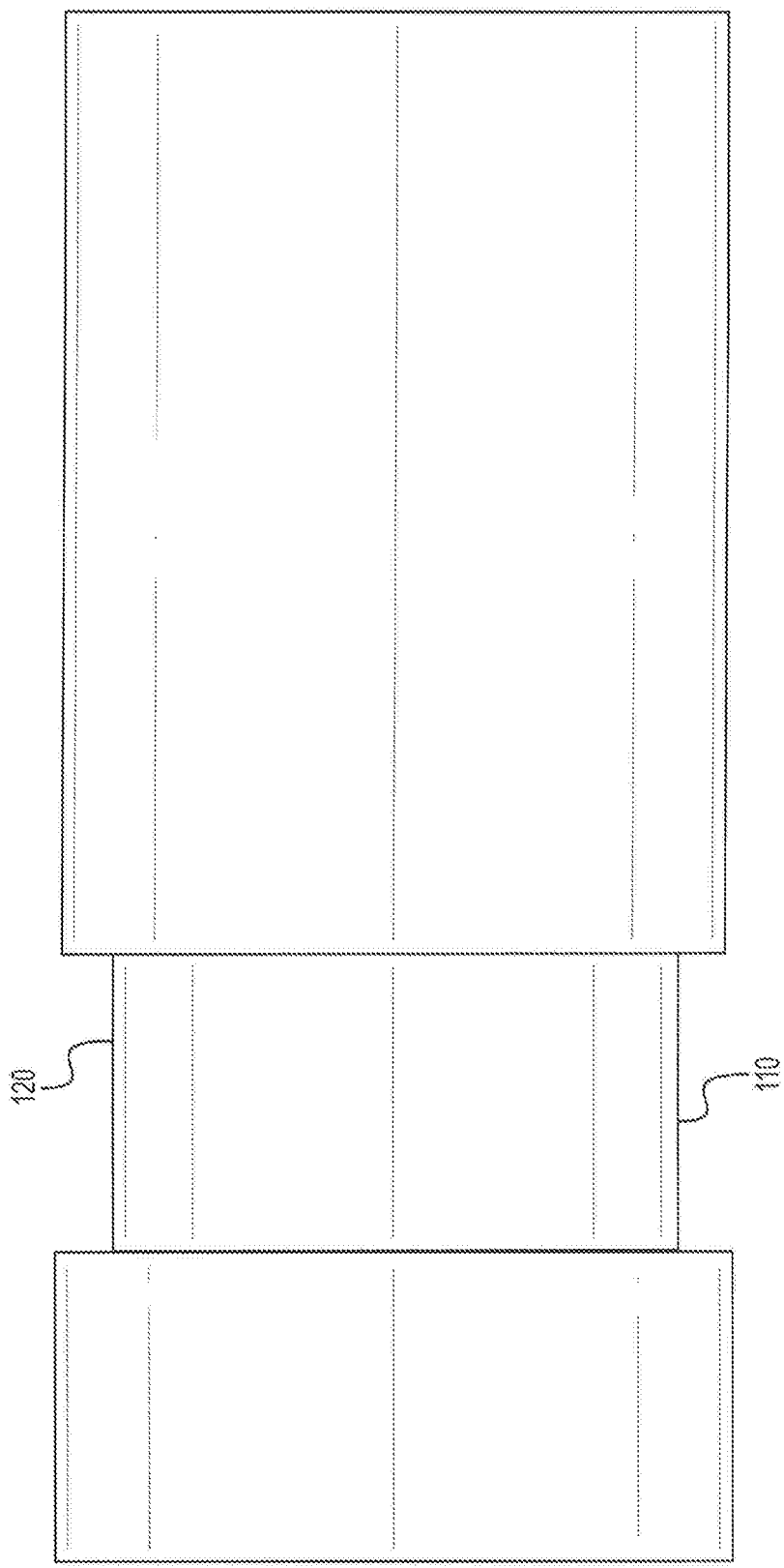
FIGS. 14A-14B are diagrammatic illustrations showing a portion of the exemplary connector of FIG. 1.
Figure 14B:
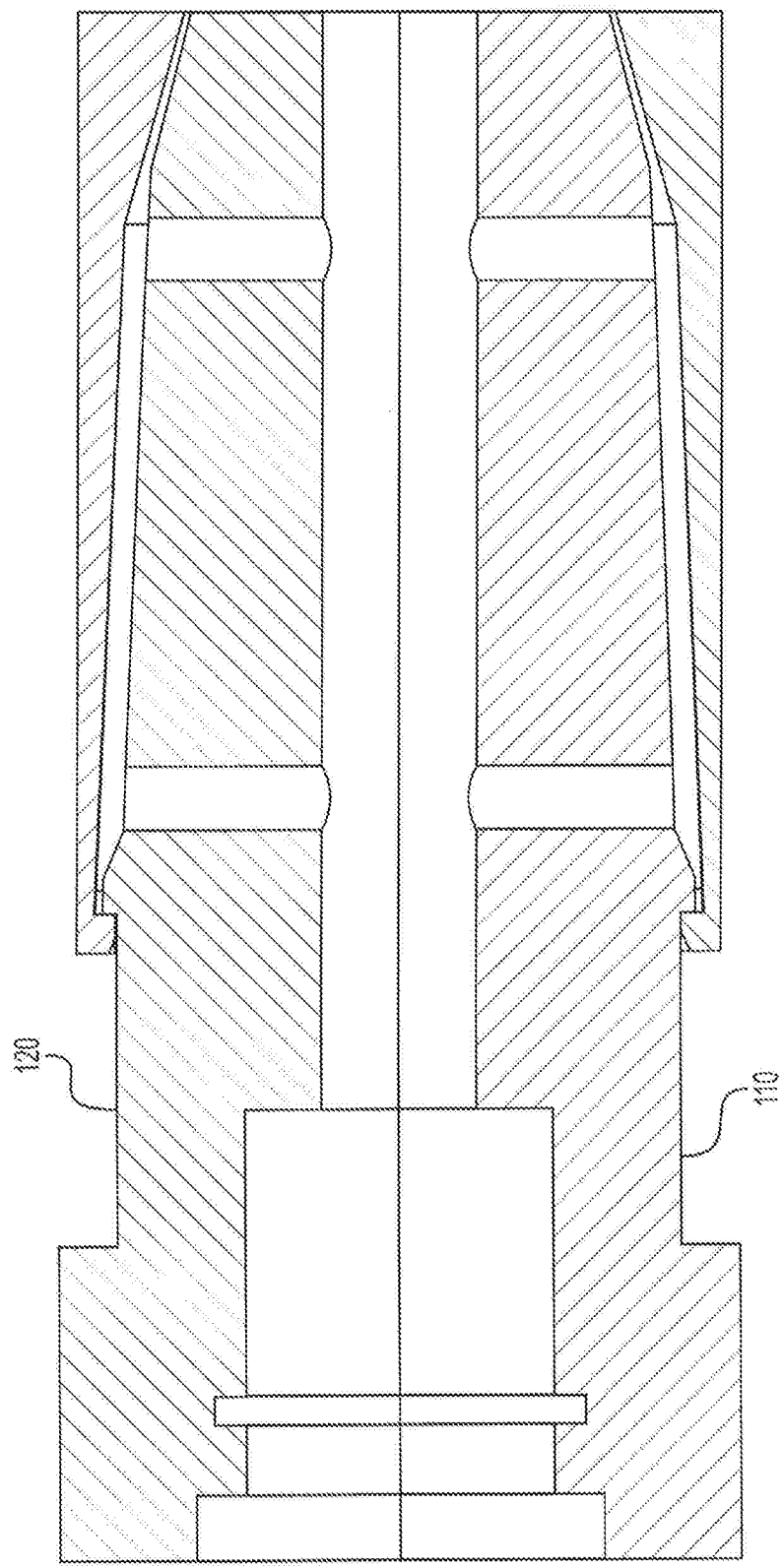

It should be appreciated that, in some embodiments, first mating member 110 and second mating member 120 may each form about ½ of the total circumference of housing 20, as shown in FIGS. 13, 14A, and 14B. Thus, in some embodiments, first and second mating members 110, 120 may form symmetrical components that are secured with a snap-fit connection or an interference fit connection.

In some embodiments, a crimp ring 170 may be used to secure first mating member 110 with second mating member 120, as shown in FIG. 15. Crimp ring 170 may be disposed over first and second mating members 110, 120 to securely fasten these members together. However, the use of flanges 130, as discussed above, may prevent the need for crimp ring 170 (and thus also prevent the need for metal sleeve 90). Thus, flanges 130 may securely fasten first and second mating members 110, 120 together without the use of outer crimp ring 170.

In some embodiments, as shown in FIG. 16, the connector body 80 may have a tri-fold configuration that includes first mating member 110, second mating member 120, and a third mating member 180. First mating member 110 may be attached to second mating member 120 via hinges, and second mating member 120 may be attached to third mating member 180 via hinges. Accordingly, the members may be able to pivot and rotate relative to each other to fold into a closed, tubular configuration. FIG. 16 shows the tri-fold assembly in an open configuration. Metal sleeve 90 (or crimp ring 170) may be disposed over the tri-fold assembly when it is in the closed configuration in order to maintain the assembly in the closed configuration. As shown in FIG. 16, a circumferential length of first mating member 110 may be about equal to a circumferential length of third mating member 180, and a circumferential length of second mating member 120 may be greater than the circumferential lengths of each of first mating member 110 and third mating member 180.

Figure 17A:
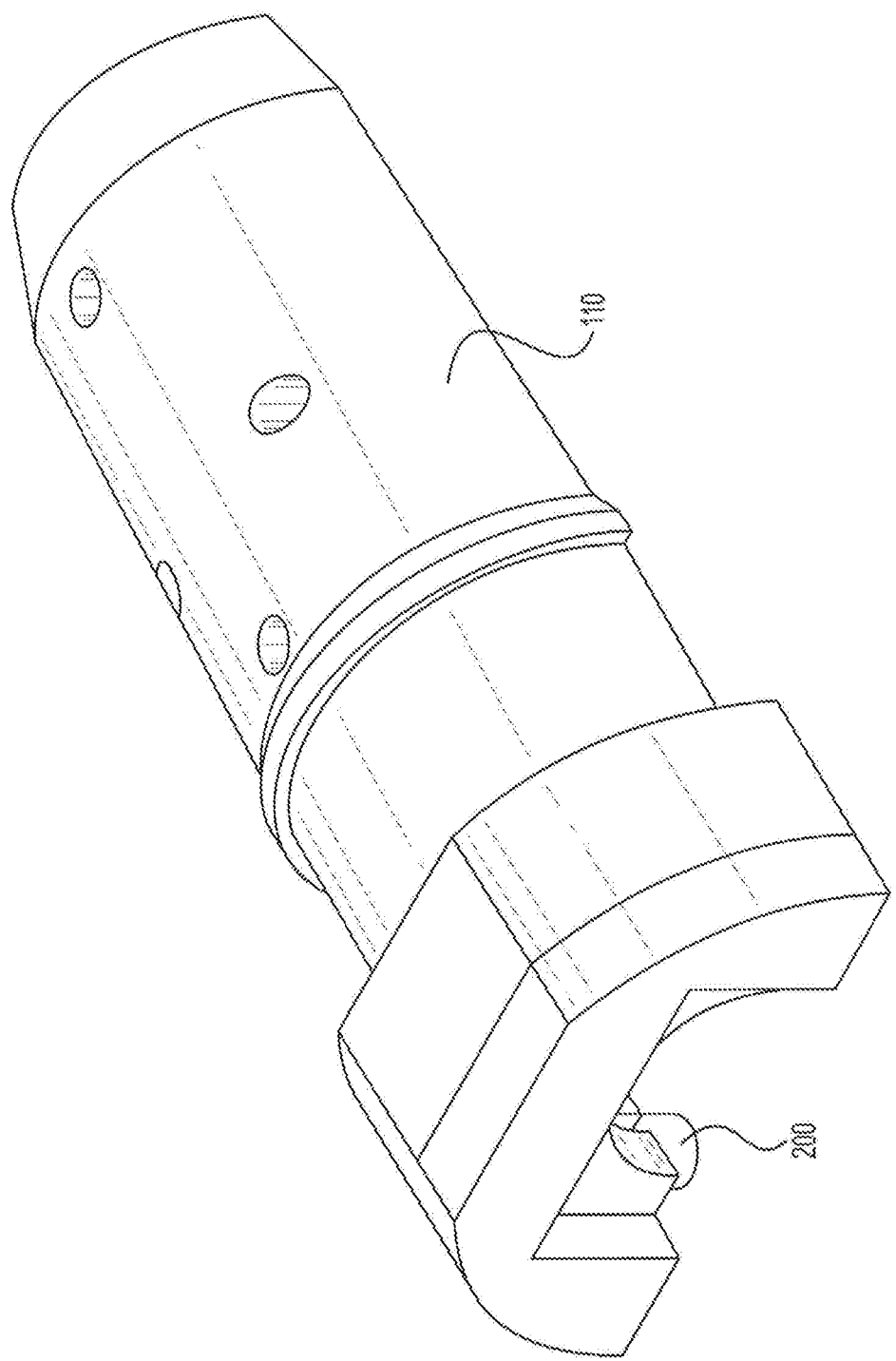

In some embodiments, as shown in FIGS. 17A and 17B, first mating member 110 and/or second mating member 120 may include one or more indentations 190 on their inner surfaces. One or more rods 200 may extend from the inner surfaces of first mating member 110 and/or second mating member 120. Thus, as shown in FIG. 17B, for example, rod 200 may extend from first mating member 110 and engage with indentation 190 on second mating member 120. The engagement between rod 200 and indentation 190 may securely fasten first mating member 110 with second mating member 200. Thus, the engagement between rod 200 and indentation 190 may prevent the need of an outer crimp, such as crimp ring 170 or metal sleeve 90.

When the connector 10 is in use, the housing 20 and/or the shroud 100 is disposed over the ferrule housing sub-assembly 30 and over the optical fiber cable 70. An outer housing (not shown) may also be disposed over connector 10. Ferrule 40 may extend outward from housing 20 and from the ferrule housing sub-assembly 30. Thus, ferrule 40 may optically interact with another ferrule on another connector in order to provide an optical connection between optical fiber cable 70 and another optical fiber cable.

It should be appreciated that in some aspects of the connector 10, the connector body 80 may include only the second mating member 120, and the first mating member 110 may be omitted. In such an embodiment, the distance between the opposed radial inner surfaces 123 of the second mating member 120 may be sized smaller than an outer diameter of the optical fiber cable 70 such that the optical fiber cable 70 is held in an interference fit relationship with the second mating member 120 by the opposed radial inner surfaces 123.

It should also be appreciated that the connector 10 may be formed of a sufficiently hard material in order to withstand extreme weather and environmental conditions so as to be appropriate for outdoor use (i.e., outside of the home).

It will be apparent to those skilled in the art that various modifications and variations can be made to the connector of the present disclosure. Other embodiments of the connector will be apparent to those skilled in the art from consideration of the specification and practice of the method disclosed herein.

What is claimed is:

1. A fiber optic connector comprising:
   a connector body extending in an axial direction from a rearward end to a forward end, a portion of the connector body having a cylindrical wall;
   a connector sub-assembly configured to receive an optical fiber cable, the connector body being configured to hold the connector sub-assembly;
   a ferrule holder configured to receive a ferrule that terminates an optical fiber cable, the connector sub-assembly being configured to hold the ferrule holder;
   a shroud configured to encircle the connector body, the shroud including at least one arm configured to extend forward of the connector body in the axial direction; and
   a housing configured to be threadedly coupled with the shroud,
   wherein the connector body is configured to include a first mating member and a second mating member that are configured to be coupled together,
   wherein the first mating member includes an arcuate wall that extends in the axial direction and a cantilevered flange that extends from the arcuate portion in a direction transverse to the axial direction,
   wherein the second mating member includes an arcuate wall that extends in the axial direction, the arcuate wall being configured to delimit an opening extending in the axial direction, the opening being configured to receive the first mating member,
   wherein the second mating member includes a groove in an inner surface of the arcuate wall, the groove being configured to extend in the transverse direction from the opening to an opposite wall of the second mating member,
   wherein the groove is delimited by two radial walls spaced apart in the axial direction and connected by an axial wall, the axial wall being configured to form a chord of the cylindrical wall of the connector body,
   wherein the second mating member includes a through hole extending through the opposite wall at an end of the groove, and
   wherein the groove is configured to receive the cantilevered flange and the through hole is configured to receive an end of the cantilevered flange to securely fasten the first mating member with the second mating member.

2. The fiber optic connector according to claim 1,
   wherein the first mating member includes a second cantilevered flange that extends from the arcuate portion in a direction transverse to the axial direction and is spaced from the cantilevered flange in a third direction perpendicular to the axial direction and the transverse direction,
   wherein the second mating member includes a second groove in an inner surface of the arcuate wall, the second groove being spaced from the groove in the third direction and being configured to extend in the transverse direction from the opening to an opposite wall of the second mating member,
   wherein the second groove is delimited by two radial walls spaced apart in the axial direction and connected by an axial wall, the axial wall being configured to form a chord of the cylindrical wall of the connector body,
   wherein the second mating member includes a second through hole extending through the opposite wall at an end of the second groove, and
   wherein the second groove is configured to receive the second cantilevered flange and the second through hole is configured to receive an end of the second cantilevered flange to securely fasten the first mating member with the second mating member.

3. The fiber optic connector according to claim 1,
   wherein the first mating member includes a second cantilevered flange that extends from the arcuate portion in a direction transverse to the axial direction and is spaced from the cantilevered flange in the axial direction,
   wherein the second mating member includes a second groove in an inner surface of the arcuate wall, the second groove being spaced from the groove in the axial direction and being configured to extend in the transverse direction from the opening to an opposite wall of the second mating member,
   wherein the second groove is delimited by two radial walls spaced apart in the axial direction and connected by an axial wall, the axial wall being configured to form a chord of the cylindrical wall of the connector body,
   wherein the second mating member includes a second through hole extending through the opposite wall at an end of the second groove, and
   wherein the second groove is configured to receive the second cantilevered flange and the second through hole is configured to receive an end of the second cantilevered flange to securely fasten the first mating member with the second mating member.

4. The fiber optic connector according to claim 1, wherein the flange and the through hole form a snap-fit connection between the first mating member and the second mating member.

5. A preconnectorized cable including:
   a fiber optic cable; and
   the fiber optic connector of claim 1 attached to the fiber optic cable.

6. A fiber optic connector comprising:
   a connector body extending in an axial direction from a rearward end to a forward end, a portion of the connector body having a cylindrical wall;
   a connector sub-assembly configured to receive an optical fiber cable, the connector body being configured to hold the connector sub-assembly, and the connector sub-assembly being configured to hold a ferrule holder;
   wherein the connector body is configured to include a first mating member and a second mating member that are configured to be coupled together,
   wherein the first mating member includes an arcuate wall that extends in the axial direction and a cantilevered flange that extends from the arcuate portion in a direction transverse to the axial direction,
   wherein the second mating member includes an arcuate wall that extends in the axial direction, the arcuate wall being configured to delimit an opening extending in the axial direction, the opening being configured to receive the first mating member, wherein the second mating member includes a groove in an inner surface of the arcuate wall, the groove being configured to extend in the transverse direction from the opening to an opposite wall of the second mating member, wherein the groove is delimited by two radial walls spaced apart in the axial direction and connected by an axial wall, the axial wall being configured to form a chord of the cylindrical wall of the connector body, wherein the second mating member includes a through hole extending through the opposite wall at an end of the groove, and wherein the groove is configured to receive the cantilevered flange and the through hole is configured to receive an end of the cantilevered flange to securely fasten the first mating member with the second mating member.

7. The fiber optic connector according to claim 6, wherein the first mating member includes a second cantilevered flange that extends from the arcuate portion in a direction transverse to the axial direction and is spaced from the cantilevered flange in a third direction perpendicular to the axial direction and the transverse direction, wherein the second mating member includes a second groove in an inner surface of the arcuate wall, the second groove being spaced from the groove in the third direction and being configured to extend in the transverse direction from the opening to an opposite wall of the second mating member, wherein the second groove is delimited by two radial walls spaced apart in the axial direction and connected by an axial wall, the axial wall being configured to form a chord of the cylindrical wall of the connector body, wherein the second mating member includes a second through hole extending through the opposite wall at an end of the second groove, and wherein the second groove is configured to receive the second cantilevered flange and the second through hole is configured to receive an end of the second cantilevered flange to securely fasten the first mating member with the second mating member.

8. The fiber optic connector according to claim 6, wherein the first mating member includes a second cantilevered flange that extends from the arcuate portion in a direction transverse to the axial direction and is spaced from the cantilevered flange in the axial direction, wherein the second mating member includes a second groove in an inner surface of the arcuate wall, the second groove being spaced from the groove in the axial direction and being configured to extend in the transverse direction from the opening to an opposite wall of the second mating member, wherein the second groove is delimited by two radial walls spaced apart in the axial direction and connected by an axial wall, the axial wall being configured to form a chord of the cylindrical wall of the connector body, wherein the second mating member includes a second through hole extending through the opposite wall at an end of the second groove, and wherein the second groove is configured to receive the second cantilevered flange and the second through hole is configured to receive an end of the second cantilevered flange to securely fasten the first mating member with the second mating member.

9. The fiber optic connector according to claim 6, wherein the flange and the through hole form a snap-fit connection between the first mating member and the second mating member.

10. The fiber optic connector according to claim 6, wherein the first mating member has a circumferential length that is about ¼ of a total circumferential dimension of the connector body, and the second mating member has a circumferential dimension that is about ¾ of the total circumferential dimension of the connector body.

11. The fiber optic connector according to claim 6, further comprising a ferrule holder configured to receive a ferrule that terminates an optical fiber cable.

12. The fiber optic connector according to claim 6, further comprising:
    a shroud configured to encircle the connector body, the shroud including at least one arm configured to extend forward of the connector body in the axial direction; and
    a housing configured to be threadedly coupled with the shroud.

13. A preconnectorized cable including:
    a fiber optic cable; and
    the fiber optic connector of claim 6 attached to the fiber optic cable.

14. A connector body for a fiber optic connector, the connector body comprising:
    a first mating member and a second mating member configured to be coupled together to form a cylindrical wall extending in an axial direction from a rearward end to a forward end,
    wherein the first mating member includes an arcuate wall that extends in the axial direction and a cantilevered flange that extends from the arcuate portion in a direction transverse to the axial direction,
    wherein the second mating member includes an arcuate wall that extends in the axial direction, the arcuate wall being configured to delimit an opening extending in the axial direction, the opening being configured to receive the first mating member,
    wherein the second mating member includes a groove in an inner surface of the arcuate wall, the groove being configured to extend in the transverse direction from the opening to an opposite wall of the second mating member,
    wherein the groove is delimited by two radial walls spaced apart in the axial direction and connected by an axial wall, the axial wall being configured to form a chord of the cylindrical wall of the connector body,
    wherein the second mating member includes a through hole extending through the opposite wall at an end of the groove, and
    wherein the groove is configured to receive the cantilevered flange and the through hole is configured to receive an end of the cantilevered flange to securely fasten the first mating member with the second mating member.

15. The fiber optic connector according to claim 14,
    wherein the first mating member includes a second cantilevered flange that extends from the arcuate portion in a direction transverse to the axial direction and is spaced from the cantilevered flange in a third direction perpendicular to the axial direction and the transverse direction, wherein the second mating member includes a second groove in an inner surface of the arcuate wall, the second groove being spaced from the groove in the third direction and being configured to extend in the transverse direction from the opening to an opposite wall of the second mating member, wherein the second groove is delimited by two radial walls spaced apart in the axial direction and connected by an axial wall, the axial wall being configured to form a chord of the cylindrical wall of the connector body, wherein the second mating member includes a second through hole extending through the opposite wall at an end of the second groove, and wherein the second groove is configured to receive the second cantilevered flange and the second through hole is configured to receive an end of the second cantilevered flange to securely fasten the first mating member with the second mating member.

16. The fiber optic connector according to claim 14, wherein the first mating member includes a second cantilevered flange that extends from the arcuate portion in a direction transverse to the axial direction and is spaced from the cantilevered flange in the axial direction, wherein the second mating member includes a second groove in an inner surface of the arcuate wall, the second groove being spaced from the groove in the axial direction and being configured to extend in the transverse direction from the opening to an opposite wall of the second mating member, wherein the second groove is delimited by two radial walls spaced apart in the axial direction and connected by an axial wall, the axial wall being configured to form a chord of the cylindrical wall of the connector body, wherein the second mating member includes a second through hole extending through the opposite wall at an end of the second groove, and wherein the second groove is configured to receive the second cantilevered flange and the second through hole is configured to receive an end of the second cantilevered flange to securely fasten the first mating member with the second mating member.

17. The connector body according to claim 14, wherein the flange and the through hole form a snap-fit connection between the first mating member and the second mating member.

18. The connector body according to claim 14, wherein the first mating member forms a smaller circumferential portion of the connector body than the second mating member.

19. The connector body according to claim 18, wherein the first mating member has a circumferential length that is about ¼ of a total circumferential dimension of the connector body, and the second mating member has a circumferential dimension that is about ¾ of the total circumferential dimension of the connector body.

20. The connector body according to claim 14, wherein an outer circumferential surface of the first mating member and the outer circumferential surface of the second mating member are configured to be continuous when the first mating member and the second mating member are assembled.

21. A fiber optic connector comprising:

the connector body of claim 14;

a connector sub-assembly configured to receive an optical fiber cable, the connector body being configured to hold the connector sub-assembly;

a ferrule holder configured to receive a ferrule that terminates an optical fiber cable, the connector sub-assembly being configured to hold the ferrule holder;

a shroud configured to encircle the connector body, the shroud including at least one arm configured to extend forward of the connector body in the axial direction; and a housing configured to be threadedly coupled with the shroud.

22. A preconnectorized cable including:

a fiber optic cable; and the fiber optic connector of claim 21 attached to the fiber optic cable.

* * * * *